(12) United States Patent
Selvi

(10) Patent No.: US 12,164,707 B2
(45) Date of Patent: Dec. 10, 2024

(54) METHODS AND SYSTEMS FOR A ROTARY USER INTERFACE FOR TOUCHSCREEN DISPLAYS

(71) Applicant: GE Precision Healthcare LLC, Wauwatosa, WI (US)

(72) Inventor: Godwin Christopher Selvi, Karnataka (IN)

(73) Assignee: GE PRECISION HEALTHCARE LLC, Wauwatosa, WI (US)

(*) Notice: Subject to any disclaimer, the term of this patent is extended or adjusted under 35 U.S.C. 154(b) by 0 days.

(21) Appl. No.: 17/807,973

(22) Filed: Jun. 21, 2022

(65) Prior Publication Data

US 2023/0409132 A1 Dec. 21, 2023

(51) Int. Cl.
*G06F 3/0362* (2013.01)
*G06F 3/0488* (2022.01)

(52) U.S. Cl.
CPC .......... *G06F 3/0362* (2013.01); *G06F 3/0488* (2013.01)

(58) Field of Classification Search
CPC ................. G06F 3/0488; G06F 3/0362; G06F 3/0354–03544
See application file for complete search history.

(56) References Cited

U.S. PATENT DOCUMENTS

| | | | |
|---|---|---|---|
| 8,274,487 B2 | 9/2012 | Meier-Arendt et al. | |
| 9,310,901 B2 | 4/2016 | Wussler et al. | |
| 10,635,200 B1 | 4/2020 | Lin et al. | |
| 10,705,629 B1 | 7/2020 | Arnold et al. | |
| 10,838,523 B2 | 11/2020 | Lopez et al. | |
| 11,003,262 B2 | 5/2021 | Pfau et al. | |
| 2014/0267637 A1* | 9/2014 | Hoberman | G06F 1/1632 348/53 |
| 2020/0073487 A1* | 3/2020 | Ballan | G06F 3/0362 |
| 2020/0089337 A1* | 3/2020 | Togashi | G02F 1/13338 |
| 2022/0137727 A1* | 5/2022 | Kono | G06F 3/0443 345/174 |

FOREIGN PATENT DOCUMENTS

| | | |
|---|---|---|
| CN | 113471006 A | 10/2021 |
| WO | 0060570 A1 | 10/2000 |
| WO | 2021140550 A1 | 7/2021 |

OTHER PUBLICATIONS

"Home Appliance Knob-on-Display Touchscreen," YouTube Website, Available Online at https://www.youtube.com/watch?v=uqerKv49KnY, Feb. 4, 2020, 4 pages.

(Continued)

*Primary Examiner* — Hang Lin
(74) *Attorney, Agent, or Firm* — McCoy Russell LLP

(57) ABSTRACT

Various methods and systems are provided for a rotary user interface for a touchscreen display. In one embodiment, a rotary user interface for a touchscreen display comprises: an alignment touchscreen nib; a rotary interface wheel; and a rotary touchscreen nib coupled to the rotary interface wheel and rotatable relative to the alignment touchscreen nib via the rotary interface wheel. The rotary user interface may further include a confirmation touchscreen nib coupled to the rotary interface wheel.

18 Claims, 14 Drawing Sheets

(56) References Cited

OTHER PUBLICATIONS

"TACTILA: Combine the advantages of graphical displays with touch-screen based controls and tactile objects for precise adjustment," Densitron Website, Available Online at https://www.densitron.com/products/tactila, Available as Early as Apr. 19, 2021, 5 pages.
"Tactile control elements for touch-screens Rotary Knobs Data Sheet," Densitron Website, Available Online at https://www.densitron.si/sites/default/files/2019-12/Rotary%20Knob%20Data%20Sheet.pdf, Retrieved on Jun. 17, 2022, 3 pages.

* cited by examiner

METHODS AND SYSTEMS FOR A ROTARY USER INTERFACE FOR TOUCHSCREEN DISPLAYS

FIELD

Embodiments of the subject matter disclosed herein relate to user interface devices, and more particularly, to a rotary user interface for touchscreen displays.

BACKGROUND

A touch-sensitive display, such as a projected capacitive (PCAP) touchscreen display, may be configured to present visual information such as in the form of text and graphics to an operator. The touchscreen display may be used by the operator to enter commands, visualize data, etc. The operator may interact with the touchscreen by using their fingers, for example, to adjust parameters displayed by the touchscreen display. A graphical user interface (GUI) may be displayed by the touchscreen display and the operator may interact with the GUI by touching the touchscreen display. The GUI may respond differently according to various touch motions applied to the touchscreen display by the operator, such as pinching motions, dragging motions, etc.

BRIEF DESCRIPTION

In one embodiment, a rotary user interface for a touchscreen display comprises: an alignment touchscreen nib; a rotary interface wheel; and a rotary touchscreen nib coupled to the rotary interface wheel and rotatable relative to the alignment touchscreen nib via the rotary interface wheel.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

Figure 1:
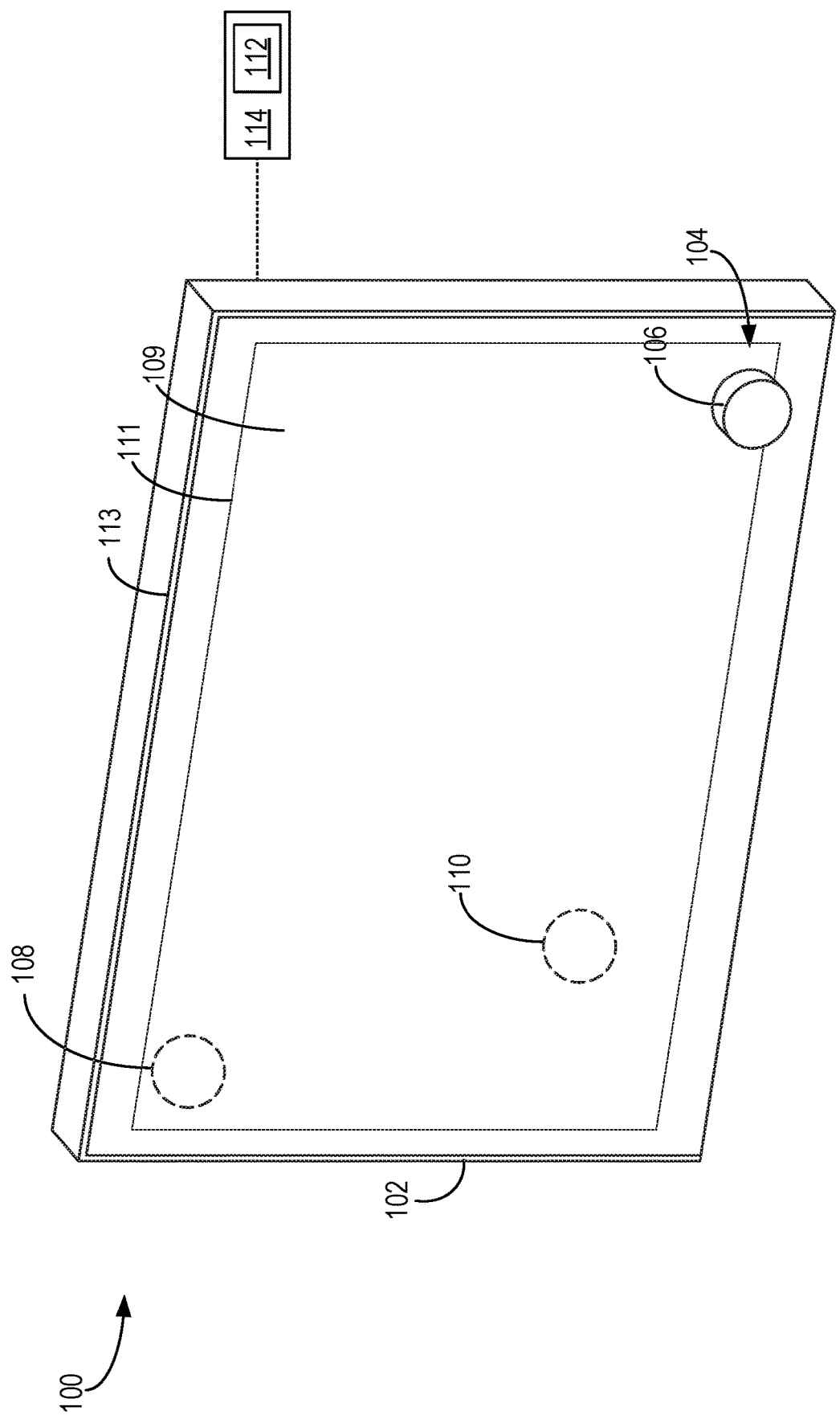
FIG. 1 shows a perspective view of a touchscreen system with a rotary user interface according to an embodiment of the disclosure.

The following description relates to various embodiments for methods and systems for a rotary user interface for touchscreen displays.

A rotary user interface as described herein may be referred to as a com wheel, and according to the embodiments described herein, a com wheel includes a plurality of pins configured to provide an indication of the position of the com wheel with respect to a touchscreen display during conditions in which the com wheel is mounted to the touchscreen display. The plurality of pins may be biased in a direction toward the touchscreen display by respective biasing members housed within respective pin supports. The biasing of the pins increases a likelihood of contact of the pins against the touchscreen display and reduces a likelihood of uneven contact of the com wheel with the touchscreen display (e.g., reduces a likelihood of wobbling of the com wheel). Each of the pins may be conductive such that during conditions in which a given pin is in direct face-sharing contact with the touchscreen display, the touchscreen display may sense the position of the given pin. As one example, the touchscreen display may be a projected capacitive touchscreen display. The com wheel may include a rotary knob, a rotary knob support, a pin configured to provide an indication of pressing of the rotary knob by an operator (e.g., a clinician, technician, etc.), a pin configured to provide an indication of a turning of the rotary knob by the operator, and a pin configured to provide an indication of the location of the com wheel along the touchscreen display. The rotary knob may be referred to herein as a rotary interface wheel. The com wheel additionally includes a touchscreen mounting element, such as a suction cup, for mounting the com wheel to the touchscreen display. The touchscreen display may be configured to detect (e.g., sense, measure, etc.) multiple pins in contact with the surface of the touchscreen display. In some embodiments, the com wheel may include pins arranged to increase an ease of detection of the position of the com wheel along the touchscreen display during conditions in which a portion of the com wheel is arranged off of the touchscreen display.

An operator may turn the rotary knob of the com wheel in order to adjust parameters shown within a graphical user interface (GUI) displayed by the touchscreen display. For example, the com wheel may be mounted to the touchscreen display via the touchscreen mounting element, which may be a suction cup, and an electronic controller of the touchscreen display may determine that the com wheel has been mounted to the touchscreen display based on contact between the pins of the com wheel and the touchscreen display. As one example, the electronic controller may be configured to determine that the com wheel has been mounted to the touchscreen display based on a detected (e.g., sensed, measured, etc.) spacing between pins in direct contact with the touchscreen display. The spacing between the pins may be sufficiently small, such as between 2 millimeters and 1 centimeter, such that the electronic controller may determine that the pins in contact with the touchscreen display are pins of the com wheel and not fingers of the operator.

During conditions in which the electronic controller determines that the com wheel is mounted to the touchscreen display, the electronic controller may transmit electronic signals to the touchscreen display to display a widget (e.g., spin wheel widget) of the graphical user interface at the location of the touchscreen display corresponding to the mounted location of the com wheel. The widget may be sized according to a spacing between opposing pins of the com wheel that rotate while the rotary knob of the com wheel is rotated, in some embodiments (e.g., sized based on a diameter of a circular path traveled by the opposing pins as the rotary knob is rotated). In some embodiments, the com wheel may include pins configured to contact the touchscreen display during conditions in which the com wheel is mounted to the touchscreen display with at least a portion of the com wheel arranged over an edge of the touchscreen display.

During conditions in which the com wheel is mounted to the touchscreen display, as the rotary knob of com wheel is rotated, a set of the pins of the com wheel may rotate along with the rotary knob and the electronic controller may control the GUI responsive to the rotation of the rotary knob and pins. For example, the controller may increase or decrease parameters displayed by the GUI (e.g., imaging parameters, etc.) responsive to the rotation of the rotary knob and pins. As one example, the operator may rotate the rotary knob clockwise to increase parameters displayed by the GUI, and the operator may rotate the rotary knob counterclockwise to decrease the parameters displayed by the GUI.

Some of the pins of the com wheel may have a shorter length relative to other pins of the com wheel. The shorter pins may be configured such that the shorter pins do not come into direct contact with the surface of the touchscreen display during conditions in which the operator does not press the rotary knob toward the touchscreen display. However, during conditions in which the rotary knob is pressed toward the touchscreen display, the shorter pins may come into contact with the touchscreen display. During conditions in which the shorter pins come into contact with the touchscreen display, the electronic controller may determine that the rotary knob has been pressed by the operator and may control the GUI accordingly (e.g., enter, confirm, accept, etc. parameters selected and/or input by the operator).

Because the com wheel may be mounted or unmounted from the touchscreen display according to operator preference, the operator may additionally reposition the com wheel to a plurality of different locations along the surface of the touchscreen display as desired. The repositioning of the com wheel may increase an ease of cleaning and/or maintenance of the com wheel and/or touchscreen display. Because the com wheel may be positioned proximate to locations along the touchscreen display in which adjustments to the GUI are performed, the com wheel may increase a user-friendliness of operation of the GUI. Further, during conditions in which the direct touch of the operator against the touchscreen display is not detectable by the touchscreen display (e.g., conditions in which the operator is wearing gloves or other apparel that may provide a barrier between the fingers of the operator and the touchscreen display but may result in undesired unresponsiveness of the touchscreen display to the touch of the operator), the com wheel may provide the operator with an interface through which to interact with the touchscreen display. Additionally, the com wheel may be used by the operator to interact with the touchscreen display in combination with interacting with the touchscreen display via the fingers of the operator (e.g., performing a pinching motion with the fingers to zoom while rotating the rotary knob of the com wheel to adjust parameters, etc.).

The rotary knob may be rotated by the operator through an entire 360 degrees of rotation and may be rotated by amounts greater than 360 degrees. In some embodiments, the com wheel may include one or more detents configured to provide predetermined rotational positions to which the rotary knob may be adjusted or maintained.

In the configurations described herein, a likelihood of undesired input to the touchscreen display may be reduced. For example, the com wheel may generate a touch event at the touchscreen display during conditions in which the operator presses or rotates the rotary knob. During conditions in which the operator does not interact with the com wheel, the operator may interact with other portions of the touchscreen display without generating undesired touch events at the location of the com wheel. In some embodiments, the pins of the com wheel may be configured such that the operator may interact with the touchscreen display via the com wheel while a portion of the com wheel is positioned off of the touch-sensitive surface of the touchscreen display. As one example, the operator may interact with the touchscreen display via the com wheel during conditions in which more than 50% of the com wheel is arranged over the touch-sensitive surface of the touchscreen display and the remaining portion is arranged over a bezel or outer edge of the touchscreen display. \

Referring to FIG. 1, a perspective view of a touchscreen system 100 including a touchscreen display 102 (e.g., touch-sensitive display screen) and a user interface is shown. The user interface 104 may be referred to herein as a com wheel and/or rotary user interface. The touchscreen system 100 may include an electronic processor, controller, memory, and/or other electronic components interfaced with the touchscreen display 102. For example, the touchscreen system 100 may include an electronic controller 112 including a processor 114 (e.g., a graphics processor) electronically coupled with the touchscreen display 102, and the electronic controller 112 may transmit electronic signals to the touchscreen display 102 for displaying images, data, etc. to a user of the touchscreen system 100 (e.g., a clinician) via the touchscreen display 102. As one example, the electronic controller 112 may transmit signals to the touchscreen display 102 to display a graphical user interface (GUI) via the touchscreen display 102. The GUI may update and/or respond to the position of the com wheel 104 along the touchscreen display 102, as described below.

The com wheel 104 is repositionable along the touchscreen display 102 and may be mounted to the touchscreen display via a touchscreen mounting element, as described further below. For example, an operator of the touchscreen system 100 (e.g., a clinician, technician, etc.) may remove the com wheel 104 from engagement with the touchscreen display 102 and may re-engage the com wheel 104 with the touchscreen display 102 via the touchscreen mounting element at a plurality of different positions along the touchscreen display 102 (e.g., first position 108, second position 110, etc.).

Because the com wheel 104 is removable from the touchscreen display 102, the com wheel 104 may be easily cleaned, maintained, etc. Further, the touchscreen display 102 may be more easily cleaned, maintained, etc. The com wheel 104 may be used with a variety of different touchscreen displays. For example, various touchscreen displays may be configured to display a GUI that updates and/or responds to the position of the com wheel 104. As one example, a GUI may include a widget that is displayed by a touchscreen display (e.g., touchscreen display 102) during conditions in which the com wheel 104 is mounted to the touchscreen display, and during conditions in which the com wheel 104 is removed from the touchscreen display, the widget may be removed from the GUI (e.g., not displayed by the touchscreen display).

The touchscreen display 102 includes a touch-sensitive surface 109, and during conditions in which the com wheel 104 is engaged with the touchscreen display 102 at the touch-sensitive surface 109, the touchscreen display 102 may detect the position of the com wheel 104 along the touch-sensitive surface 109. The touchscreen display 102 and com wheel 104 may be configured such that during conditions in which over 50% of the com wheel 104 is arranged over the touch-sensitive surface 109 and the remaining portion of the com wheel 104 is arranged over (e.g., beyond) bezel 111 and/or outer edge 113 of the touchscreen display 102, the position of the com wheel 104 may still be detected by the touchscreen display 102 as described further below.

Figure 2:
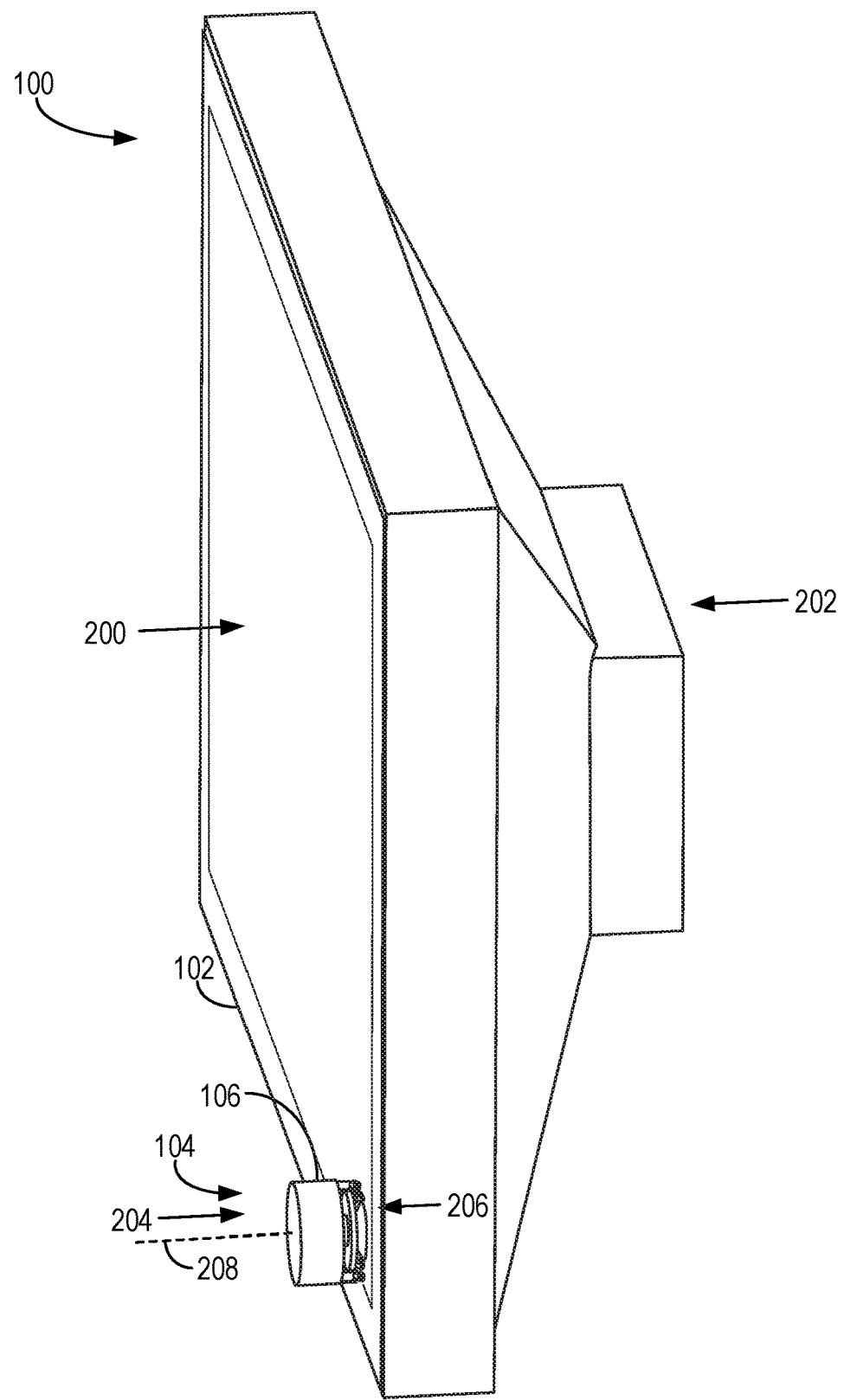
FIG. 2 shows another perspective view of the touchscreen system and rotary user interface of FIG. 1.
Figure 3:
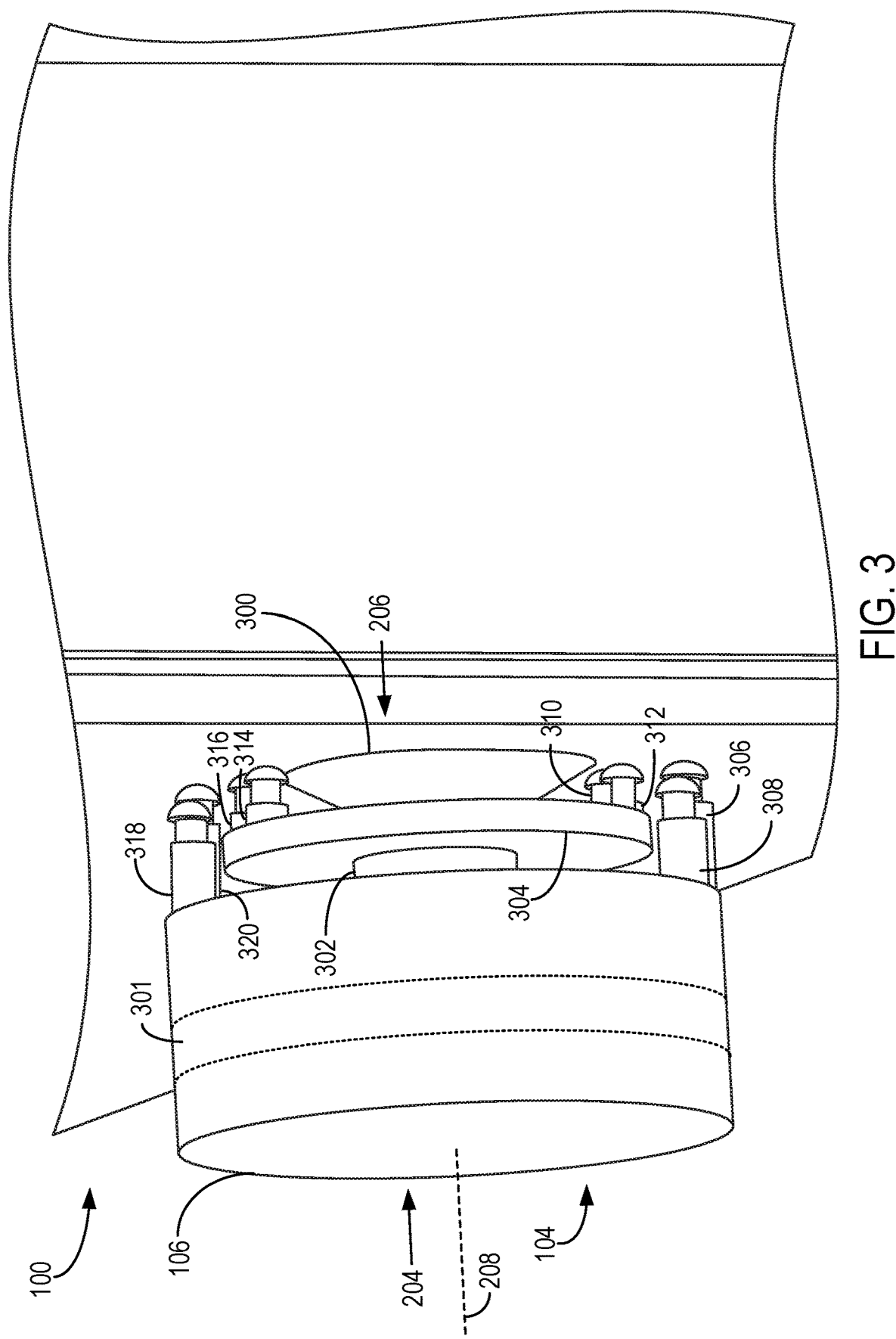
FIG. 3 shows an enlarged view of the touchscreen system and rotary user interface of FIGS. 1-2.

Referring to FIG. 2 and FIG. 3, the com wheel 104 is shown mounted to the touchscreen display 102. As shown by FIG. 3, the com wheel 104 includes touchscreen mounting element 300 configured to maintain the position (e.g., translational position) of the com wheel 104 relative to the touchscreen display 102. In some examples, the touchscreen mounting element 300 is a suction cup. The touchscreen mounting element 300 is joined to a support 302, with the support 302 joined to a rotary knob 106 (which may be referred to herein as a rotary interface wheel). In particular, the touchscreen mounting element 300 may be joined to an enlarged end section 304 of the support 302. The operator may press the touchscreen mounting element 300 of the com wheel 104 against the touchscreen display 102 to mount the com wheel 104 to the touchscreen display 102. In examples in which the touchscreen mounting element 300 is a suction cup, pressing the com wheel 104 against the touchscreen display 102 may release air from an interior of the suction cup to atmosphere, and a pressure differential between the interior of the suction cup and atmospheric air may maintain the position of the com wheel 104 against the touchscreen display 102.

The com wheel 104 includes a plurality of pin supports, as shown by FIG. 3. The pin supports are coupled to pins that may come into contact with the touchscreen display 102 during some conditions. Some of the pins included by the com wheel 104 may be configured to provide an indication of a rotational position of the rotary knob 106 to the electronic controller 112 of the touchscreen display 102, some of the pins may be configured to provide an indication of an axial position of the rotary knob 106 to the electronic controller 112, and some of the pins may be configured to provide an indication of a translational position of the com wheel 104 along the touchscreen display 102 to the electronic controller 112. In the embodiment shown, the com wheel 104 includes a set of pin supports coupled to pins configured to provide the indication of the rotational position of the rotary knob 106 to the electronic controller 112, at least one pin support including a pin configured to provide the indication of the axial position of the rotary knob 106, and a set of pin supports coupled to pins configured to provide the indication of the translational position of the com wheel 104 along the touchscreen display 102 to the electronic controller 112.

The set of pin supports coupled to pins configured to provide the indication of the rotational position of the rotary knob 106 to the electronic controller 112 includes a first pin support 306 and a second pin support 320. The com wheel 104 includes a third pin support 310 and a fourth pin support 312 coupled to pins configured to provide the electronic controller 112 with the indication of the translational position of the com wheel 104 along the touchscreen display 102. In the embodiment shown, the com wheel 104 additionally includes a fifth pin support 314 and a sixth pin support 316 coupled to pins configured to provide the electronic controller 112 with the indication of the translational position of the com wheel 104 along the touchscreen display 102.

During some conditions (e.g., conditions in which the com wheel 104 is arranged at an edge of the touchscreen display 102 and at least a portion of the com wheel 104 overhangs the outer edge 113 and/or bezel 111), the pins coupled to the third pin support 310 and the fourth pin support 312 may be arranged against the surface of the touchscreen display 102 while the pins coupled to the fifth pin support 314 and the sixth pin support 316 may be arranged off of the surface of the touchscreen display 102. During such conditions, the electronic controller 112 may determine the translational position of the com wheel 104 along the touchscreen display 102 based on the positions of the pins coupled to the third pin support 310 and the fourth pin support 312. During other conditions, the pins coupled to each of the third pin support 310, fourth pin support 312, fifth pin support 314, and sixth pin support 316 may each be in direct face-sharing contact with the surface of the touchscreen display 102, and the electronic controller 112 may determine the translational position of the com wheel 104 along the touchscreen display 102 based on the positions of each of the pins coupled to the third pin support 310, fourth pin support 312, fifth pin support 314, and sixth pin support 316. In some embodiments, the determination of the translational position of the com wheel 104 along the touchscreen display 102 may additionally be based on the position of the pins coupled the first pin support 306 and the second pin support 320.

The com wheel 104 includes a seventh pin support 308 coupled to a pin configured to provide the electronic controller 112 with an indication of the axial position of the rotary knob 106. In particular, during conditions in which the rotary knob 106 is pressed toward the touchscreen display 102 by the operator (e.g., the rotary knob 106 is in a first axial position), the pin coupled to the seventh pin support 308 may come into direct face-sharing contact with the surface of the touchscreen display 102. The electronic controller 112 may determine that the rotary knob 106 is pressed by the operator based on the contact between the pin coupled to the seventh pin support 308 and the surface of the touchscreen display 102.

During conditions in which the rotary knob 106 is not pressed against the touchscreen display 102 (e.g., the rotary knob 106 is in a second axial position), the pin coupled to the seventh pin support 308 may not be in direct face-sharing contact with the surface of the touchscreen display 102, and as a result, the electronic controller may determine that the rotary knob 106 is not pressed by the operator. In the embodiment shown, the com wheel 104 further includes an eighth pin support 318 coupled to a pin that may come into direct contact with the surface of the touchscreen display 102 during conditions in which the pin coupled to the seventh pin support 308 comes into direct contact with the surface of the touchscreen display 102. The determination of the axial position of the rotary knob 106 may be based on the position of both of the pin coupled to the seventh pin support 308 and the pin coupled to the eighth pin support 318.

Determining the position of the com wheel 104 and/or rotary knob 106 based on the position of the pins as described herein refers to determining the position of the pins (e.g., sensing, measuring, etc. the position of the pins) along the touchscreen display 102 via contact between the pins and the touchscreen display 102. As one example, during conditions in which the com wheel 104 is mounted to the touchscreen display 102 and the pin coupled to the first pin support 306 is in direct face-sharing contact with the surface of the touchscreen display 102, the electronic controller 112 may determine the position of the pin coupled to the first pin support 306 based on signals transmitted to the electronic controller 112 by the touchscreen display 102 responsive to the contact between the pin coupled to the first pin support 306 and the touchscreen display 102.

Figure 4:
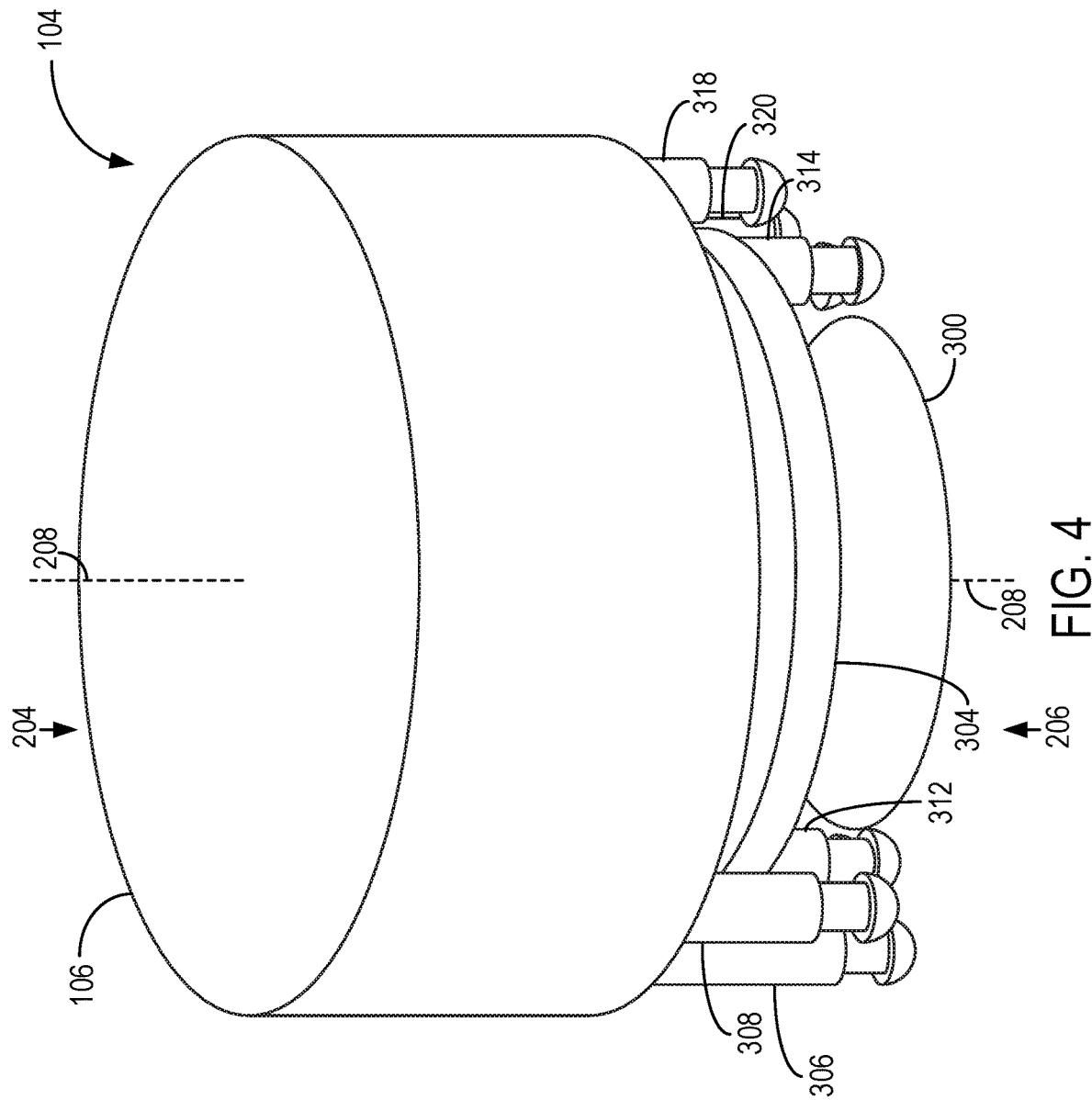
FIG. 4 shows a perspective view of a first end of a rotary user interface for a touchscreen system according to an embodiment of the disclosure.
Figure 5:
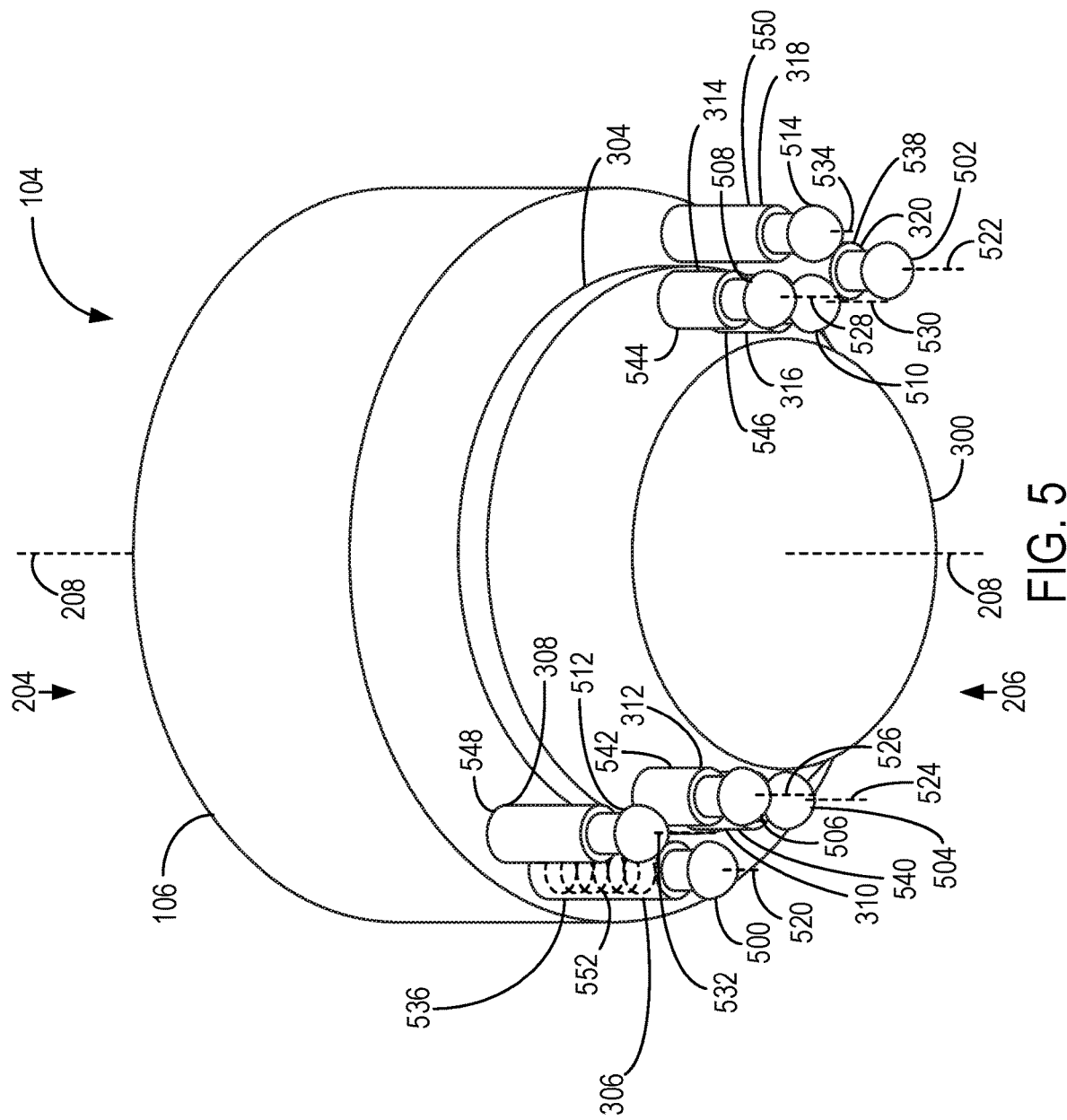
FIG. 5 shows a perspective view of a second end of the rotary user interface of FIG. 4.
Figure 6:
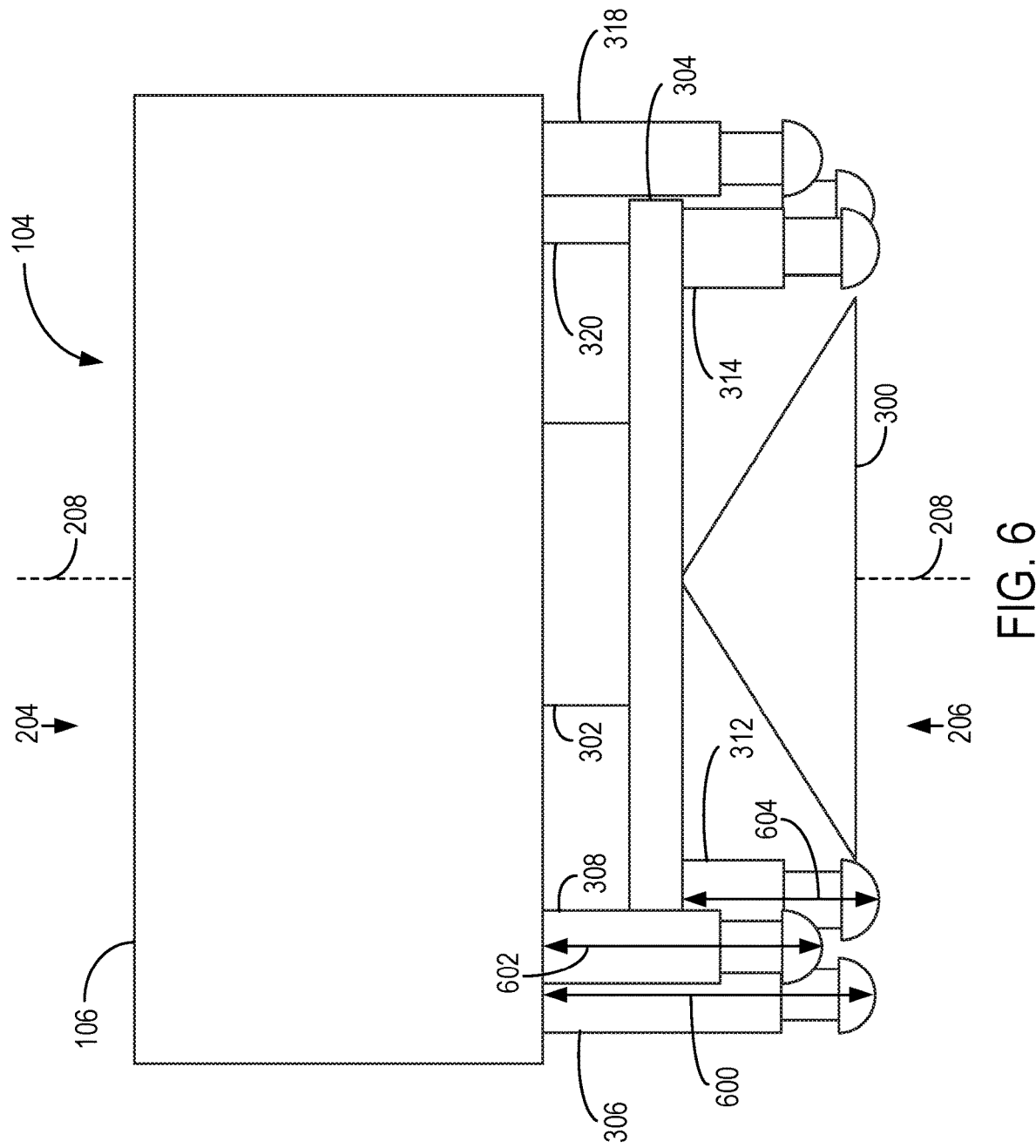
FIG. 6 shows a side view of the rotary user interface of FIGS. 4-5.
Figure 7:
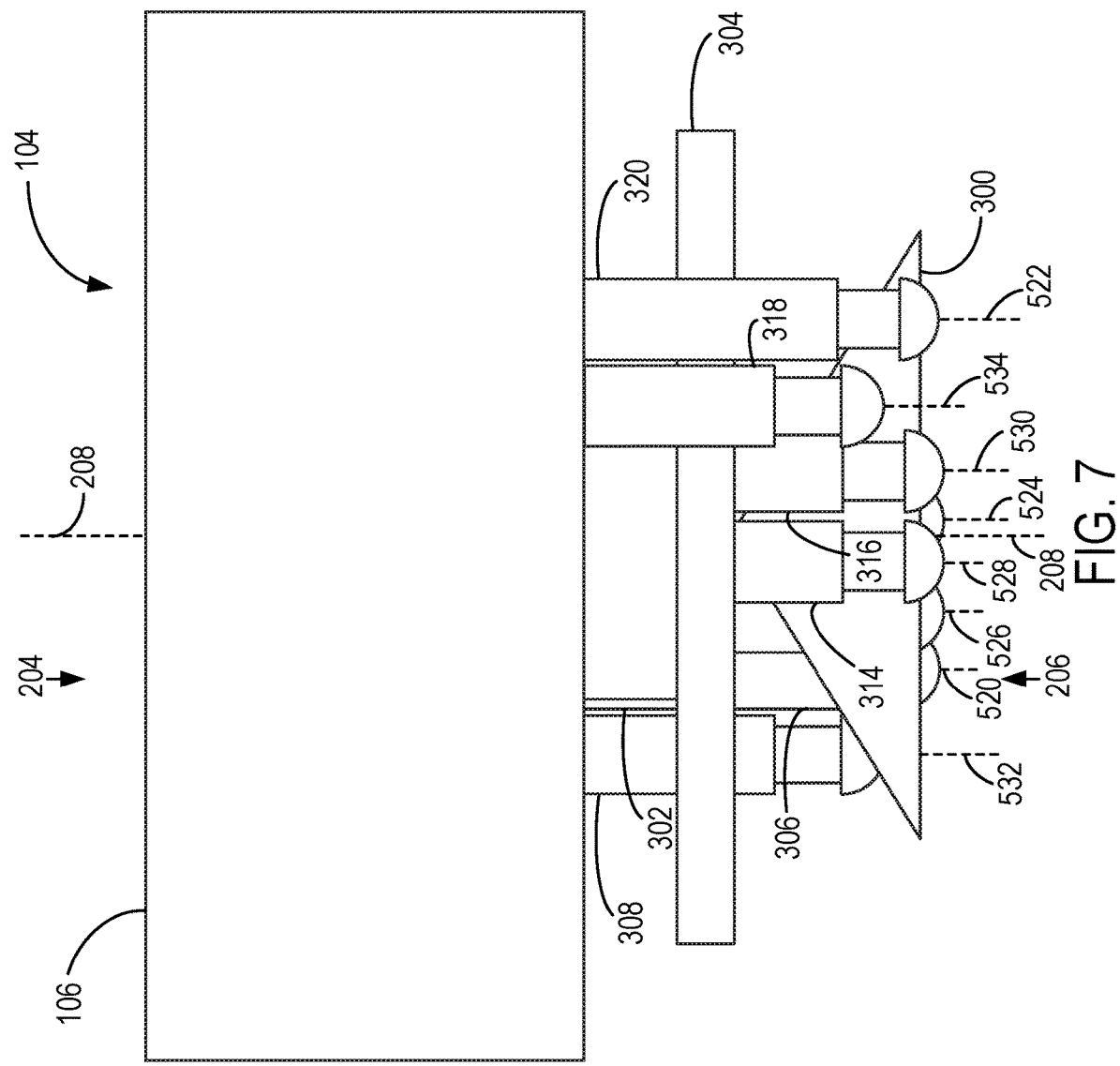
FIG. 7 shows another side view of the rotary user interface of FIGS. 4-6.
Figure 8:
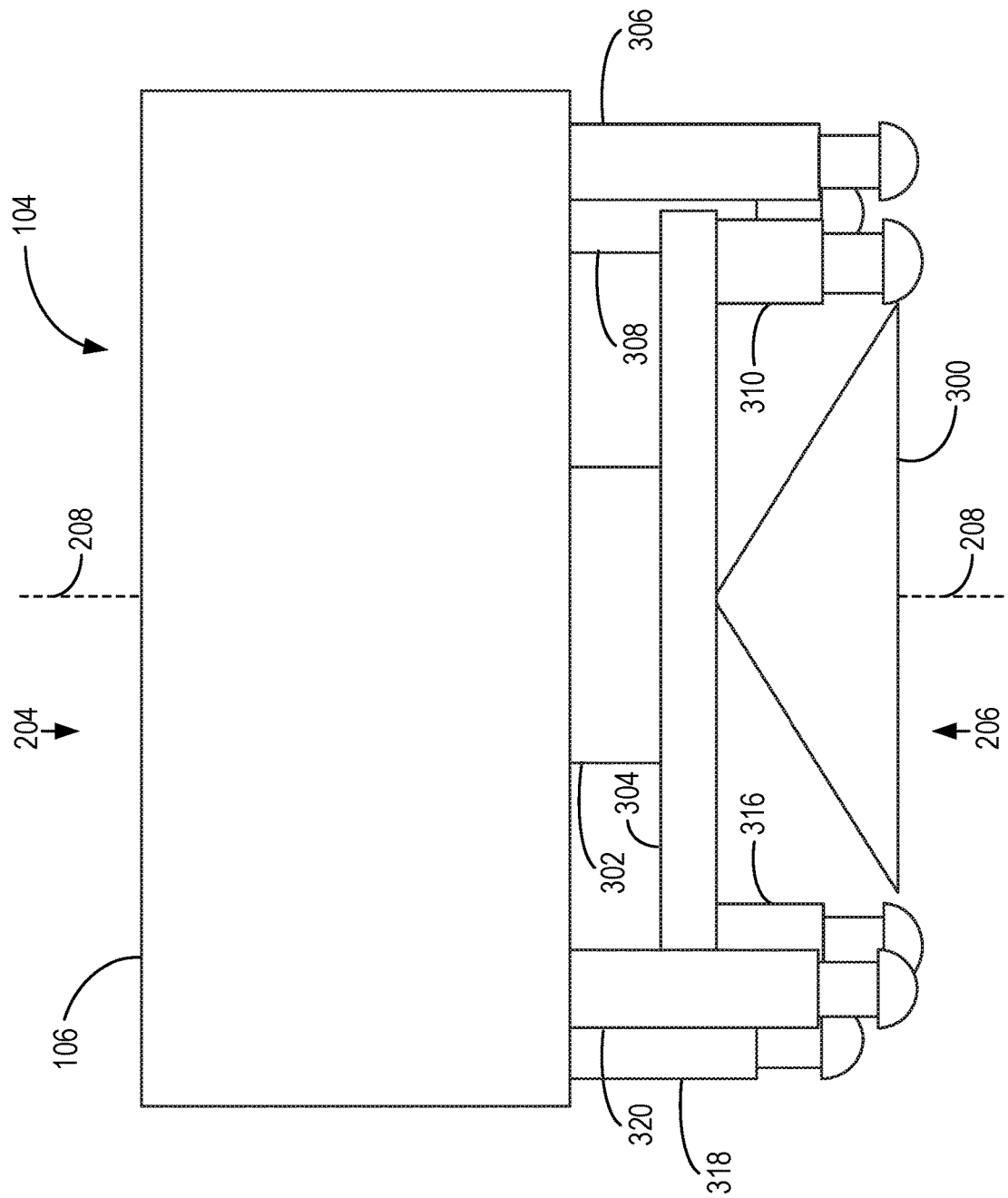
FIG. 8 shows another side view of the rotary user interface of FIGS. 4-7.
Figure 9:
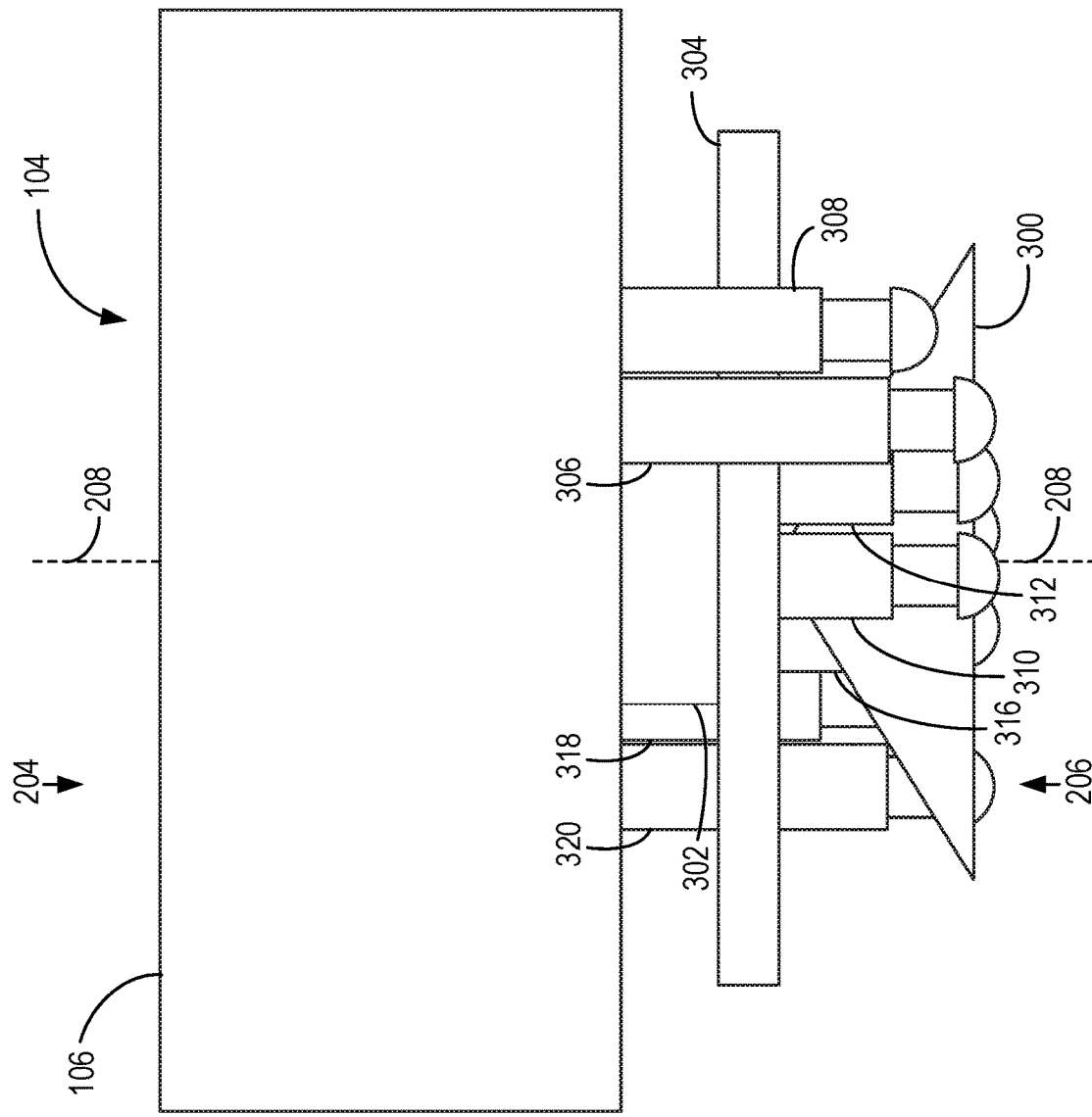
FIG. 9 shows another side view of the rotary user interface of FIGS. 4-8.

Referring collectively to FIGS. 4-11, various different views of the com wheel 104 are shown. In particular, FIG. 4 shows a top perspective view of the com wheel 104, FIG. 5 shows a bottom perspective view of the com wheel 104, FIG. 6 shows a side view of the com wheel 104, FIG. 7 shows another side view of the com wheel 104, FIG. 8 shows another side view of the com wheel 104, FIG. 9 shows another side view of the com wheel 104, and FIGS. 10-11 each show a bottom view of the com wheel 104. During conditions in which the com wheel 104 is mounted to a touchscreen display (e.g., the touchscreen display 102 shown by FIGS. 1-3 and described above), the bottom of the com wheel 104 is arranged closer to the touchscreen display than the top of the com wheel 104 (e.g., a distance between the bottom of the com wheel 104 and the touchscreen display is smaller than a distance between the top of the com wheel 104 and the touchscreen display).

The com wheel 104 includes first pin support 306 extending along axis 520, second pin support 320 extending along axis 522, third pin support 310 extending along axis 524, fourth pin support 312 extending along axis 526, fifth pin support 314 extending along axis 528, sixth pin support 316 extending along axis 530, seventh pin support 308 extending along axis 532, and eighth pin support 318 extending along axis 534. The axis 520, axis 522, axis 524, axis 526, axis 528, axis 530, axis 532, and axis 534 are each arranged parallel to each other. Additionally, the first pin support 306, second pin support 320, third pin support 310, fourth pin support 312, fifth pin support 314, sixth pin support 316, seventh pin support 308, and eighth pin support 318 are each arranged parallel to each other.

The first pin support 306 includes a first tip 500 centered along axis 520, the second pin support 320 includes a second tip 502 centered along axis 522, the third pin support 310 includes a third tip 504 centered along axis 524, the fourth pin support 312 includes a fourth tip 506 centered along axis 526, the fifth pin support 314 includes a fifth tip 508 centered along axis 528, the sixth pin support 316 includes a sixth tip 510 centered along axis 530, the seventh pin support 308 includes a seventh tip 512 centered along axis 532, and the eighth pin support 318 includes an eighth tip 514 centered along axis 534. The first pin support 306 and first tip 500 may be referred to collectively as a rotary touchscreen nib 536, the second pin support 320 and second tip 502 may be referred to collectively as a rotary touchscreen nib 538, the third pin support 310 and third tip 504 may be referred to collectively as an alignment touchscreen nib 540, the fourth pin support 312 and fourth tip 506 may be referred to collectively as an alignment touchscreen nib 542, the fifth pin support 314 and fifth tip 508 may be referred to collectively as an alignment touchscreen nib 544, the sixth pin support 316 and sixth tip 510 may be referred to collectively as an alignment touchscreen nib 546, the seventh pin support 308 and seventh tip 512 may be referred to collectively as a confirmation touchscreen nib 548, and the eighth pin support and eighth tip 514 may be referred to collectively as a confirmation touchscreen nib 550.

The rotary touchscreen nibs are directly coupled to the rotary knob 106 (which may be referred to herein as a rotary interface wheel). During conditions in which the rotary knob 106 is rotated by the user (e.g., operator), the rotary touchscreen nibs rotate along with the rotary knob 106. The alignment touchscreen nibs are directly coupled to the enlarged end section 304 of the support 302. The enlarged end section 304 may be referred to herein as a support disc. During conditions in which the rotary knob 106 is rotated, the enlarged end section 304 does not rotate. In this configuration, while the rotary touchscreen nibs rotate around the rotation axis 208 due to the rotation of the rotary knob 106, the alignment touchscreen nibs do not rotate with the rotary knob.

During conditions in which the com wheel 104 is coupled to the touchscreen display 102, each of the rotary touchscreen nibs and the alignment touchscreen nibs may be positioned directly in contact with the touch-sensitive surface of the touchscreen display 102. The confirmation touchscreen nibs are directly coupled to the rotary knob 106 such that rotation of the rotary knob 106 around the rotation axis 208 results in rotation of the confirmation touchscreen nibs around the rotation axis 208. However, as a length of each of the confirmation touchscreen nibs is smaller than a length of each of the rotary touchscreen nibs, the confirmation touchscreen nibs may not be in direct contact with the touch-sensitive surface of the touchscreen display as the rotary knob 106 is rotated. As shown by FIG. 6, each rotary touchscreen nib has a first length 600, each alignment touchscreen nib has a second length 604, and each confirmation touchscreen nib has a third length 602. In the configuration shown, the first length 600 is greater than each of the second length 604 and the third length 602, and the third length 602 is greater than the second length 604.

During conditions in which the rotary knob 106 is not pressed toward the touchscreen display 102, the rotary touchscreen nibs are configured to be in direct contact with the touch-sensitive surface of the touchscreen display 102 and the confirmation touchscreen nibs are configured to be spaced apart from the touch-sensitive surface of the touchscreen display 102 (e.g., not in direct contact the touch-sensitive surface). However, during conditions in which the user presses the com wheel 104 toward the touchscreen display 102, biasing elements within the rotary touchscreen nibs and the alignment touchscreen nibs (such as biasing element 552 of rotary touchscreen nib 536, shown schematically within an interior of the first pin support 306 in FIG. 5) may compress and enable the confirmation touchscreen nibs to come into direct contact with the touch-sensitive surface of the touchscreen display 102 (e.g., reduce the spacing between the touch-sensitive surface of the touchscreen display 102 and each of the confirmation touchscreen nibs). Compressing the biasing element within a nib may retract the tip of the nib toward the pin support of the nib. For example, pressing the com wheel 104 against the touchscreen display 102 may press the tip 500 of the rotary touchscreen nib 536 toward the first pin support 306. The tip 500 is biased by the biasing element 552, and pressing the tip 500 against the touchscreen display 102 compresses the biasing element 552 to move the tip 500 toward the first pin support 306 (e.g., slide the tip 500 within the first pin support 306). Each nib may include a respective biasing element. The touchscreen display 102 may detect the touch input applied to the touchscreen display 102 by the confirmation touchscreen nibs resulting from pressing the com wheel 104 to engage the confirmation touchscreen nibs in direct contact with the touchscreen display 102, as described further below.

Each of the tips described above may be electrically conductive such that direct contact of the tips against the touch-sensitive surface of the touchscreen display 102 may be sensed (e.g., detected, measured, etc.) by the touchscreen display 102. For example, direct contact between one of the tips and the touch-sensitive surface may induce an electric field and/or change in electrical charge distribution at the location of the contact, and/or the touchscreen display 102 may sense the contact of one of the tips and may perceive the tip as an electrically grounded component external to the touchscreen display. The touchscreen display 102 may determine the location of the tip based on the location of the induced electric field and/or change in electrical charge distribution (e.g., the location of the perceived electrically grounded external component). As one example, each tip may be formed from an electrically conductive material such as conductive material copper, indium tin oxide (ITO), etc. In some examples, each tip may be formed of a flexible material (e.g., silicone) impregnated with the electrically conductive material.

Figure 10:
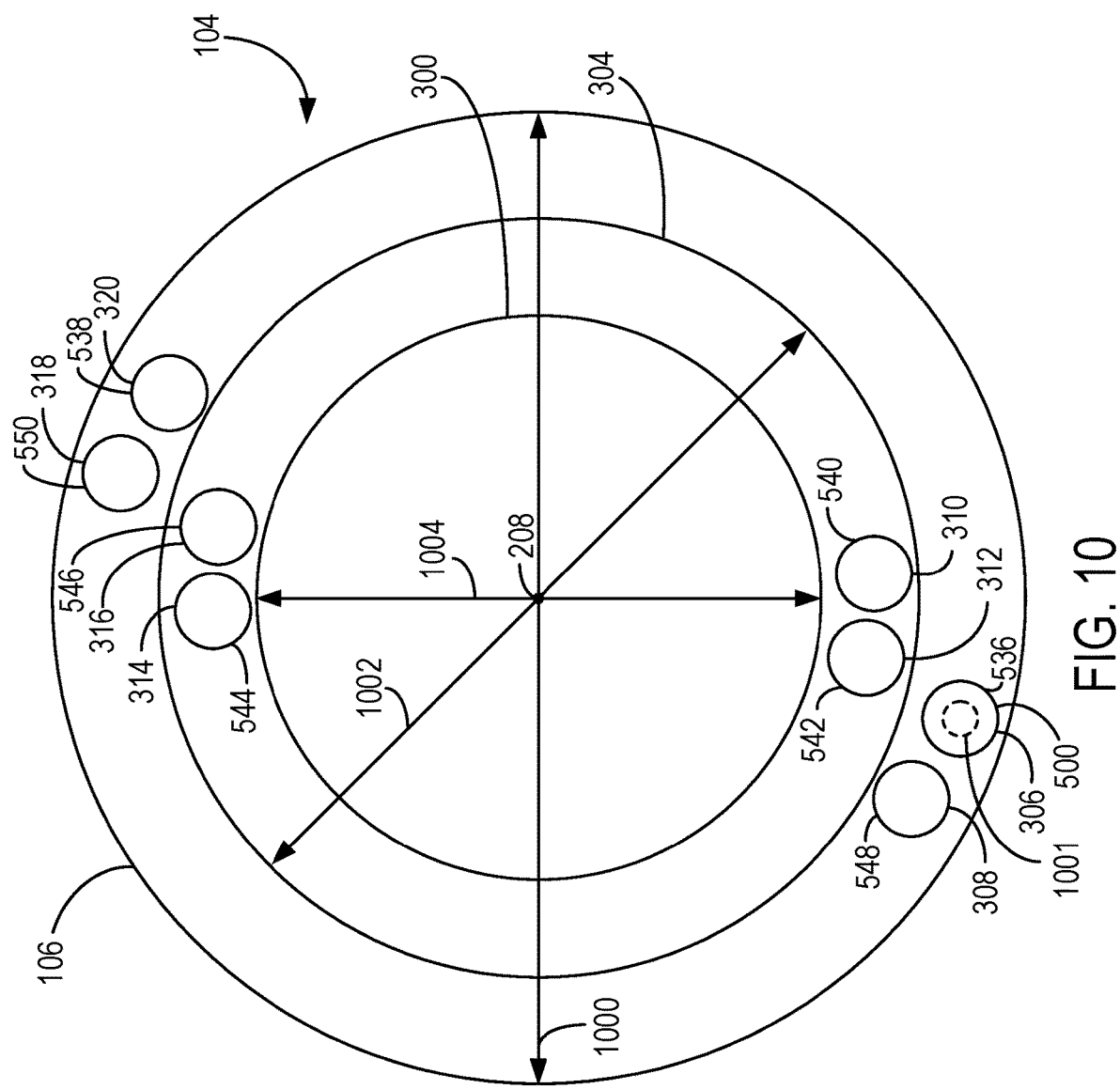
FIG. 10 shows a view of the second end of the rotary user interface of FIGS. 4-9.

In some embodiments, a size (e.g., diameter) of one or more of the tips of the nibs may be configured such that the direct contact between the tips and the touch-sensitive surface of the touchscreen display may not be detected until the operator touches the com wheel 104. For example, tip 500 is shown by FIG. 10, with dashed line 1001 indicating an example smaller size (e.g., reduced diameter) of the tip 500. During conditions in which the tip 500 is not pressed against the touchscreen display as a result of touch applied by the operator to the com wheel 104, the size of the tip 500 may be sufficiently small such that the touchscreen display does not detect the contact of the tip 500 against the touchscreen display. However, during conditions in which the operator touches the com wheel 104 (e.g., touches rotary knob 106), the touch applied by the operator may be sufficient to compress the tip 500, resulting in an increased amount of the tip 500 to be in contact with the touchscreen display (e.g., the tip 500 may deform such that the surface area of the tip 500 in direct contact with the touchscreen display increases). The increased amount of contact between the tip 500 and the touchscreen display may result in detection of the location of the tip 500 by the touchscreen display (e.g., via an induced electric field and/or change in electrical charge distribution as described above).

In other examples, portions of the tip 500 arranged toward the outer edges of the tip 500 may be electrically conductive while a center portion of the tip 500 may be electrically insulated. In such configurations, touch applied to the com wheel 104 by the operator may press the tip 500 against the touchscreen display 102 and may deform the tip 500 such that the electrically conductive portion of the tip 500 comes into direct contact with the touch-sensitive surface of the touchscreen display 102. During conditions in which the operator does not apply touch to the com wheel 104, the tip 500 may not be deformed and the electrically conductive portion may not come into direct contact with the touch-sensitive surface of the touchscreen display 102.

In the configurations described above, the size of the tips and/or the size of electrically conductive portions of the tips may be based on a sensitivity of the touchscreen display 102. For example, the touchscreen display 102 may be configured to detect direct contact of electrically conductive components having a diameter within a pre-determined range of diameters, and the tips may be configured such that the diameter of each tip is sufficiently small to be outside of the pre-determined range of diameters until the operator touches the com wheel 104 and deforms the tips against the touchscreen display. The deformed tips may have diameters within the pre-determined range of diameters, resulting in detection of the com wheel 104 by the touchscreen display 102.

As another example, the electrically conductive portion of each tip may be sufficiently small such that during conditions in which the com wheel 104 is mounted to the touchscreen display 102, the electrically conductive portion is in direct contact with the touch-sensitive surface of the touchscreen display 102 but the touchscreen display 102 does not detect the engagement of the com wheel 104 with the touchscreen display 102 due to the small size of the conduction portion of each tip while the operator is not touching the com wheel 104. However, during conditions in which the operator touches the com wheel 104, the conductive portion of each tip may form an electrical pathway between the touchscreen display 102 and the operator, which may result in an increased change in electrical capacitance of the touchscreen display 102 at the location of contact between the tips and the touch-sensitive surface of the touchscreen display 102 relative to conditions in which the com wheel 104 is not touched by the operator. As a result of the increased change in electrical capacitance, the touchscreen display 102 may detect the contact of the electrically conductive portions of the tips to determine the location of the com wheel 104 along the touchscreen display 102.

In some embodiments, the rotary knob 106 and/or other components of the com wheel 104 may include electrically conductive bands, rings, etc. configured to come into direct contact with the fingers of the operator during conditions in which the operator touches the com wheel 104. For example, an example electrically conductive ring 301 of the com wheel 104 is shown by FIG. 3. During conditions in which the operator touches the rotary knob 106, the operator may additionally touch the conductive ring 301 (e.g., the operator may grasp the rotary knob 106 with their fingers, and grasping the rotary knob 106 may result in direct contact of the fingers of the operator with the conductive ring 301). The conductive ring 301 may be electrically coupled with the conductive portion of each of the tips, such that during conditions in which the com wheel 104 is mounted to the touchscreen display 102 and the operator touches the conductive ring 301 (e.g., by grasping the rotary knob 106), the conductive portion of each tip may form an electrical pathway between the touchscreen display 102 and the operator via the conductive ring 301 (which may result in detection of the location of the com wheel 104 by the touchscreen display 102 as described above).

Although the electrically conductive portions of the tips are described herein as directly contacting the touch-sensitive surface of the touchscreen display 102, in some examples the tips may include one or more layers of electrically insulated material (e.g., silicone) at least partially surrounding the electrically conductive portions of the tips such that the electrically conductive portions are separated (e.g., spaced apart) from the touch-sensitive surface of the touchscreen display 102 by the electrically insulated material during conditions in which the tips are engaged with the touchscreen display 102. However, the electrically insulated material may be sufficiently thin such that the touchscreen display 102 may detect the engagement of conductive portions of the tips with the touch-sensitive surface of the touchscreen display 102 through the electrically insulated material (e.g., the conductive portions may alter the electrical capacitance of the touchscreen display while the tips are engaged with the touchscreen display even in configurations in which the electrically conductive portions are separated from the touchscreen display by the electrically insulated material).

By configuring the tips similar to the tip 500 as described above, detection of the com wheel 104 by the touchscreen display 102 may occur during conditions in which the operator touches the com wheel 104 and may not occur during conditions in which the operator does not touch the com wheel 104. As a result, the operator may maintain the com wheel 104 coupled to the touchscreen display 102 without causing the touchscreen display 102 to update the GUI displayed by the touchscreen display 102 until the operator interacts with the com wheel 104 (e.g., touches the rotary knob 106). Configuring the com wheel 104 to be detected by the touchscreen display 102 while the com wheel 104 is touched by the operator and to not be detected by the touchscreen display 102 while the com wheel 104 is not touched by the operator may increase an ease of use of the com wheel 104 and touchscreen display 102. For example, additional menus displayed by the GUI while the operator touches the com wheel 104 may be hidden by the GUI during conditions in which the operator does not touch the com wheel 104, which may increase a visibility and organization of menus and other features of the GUI.

Figure 11:
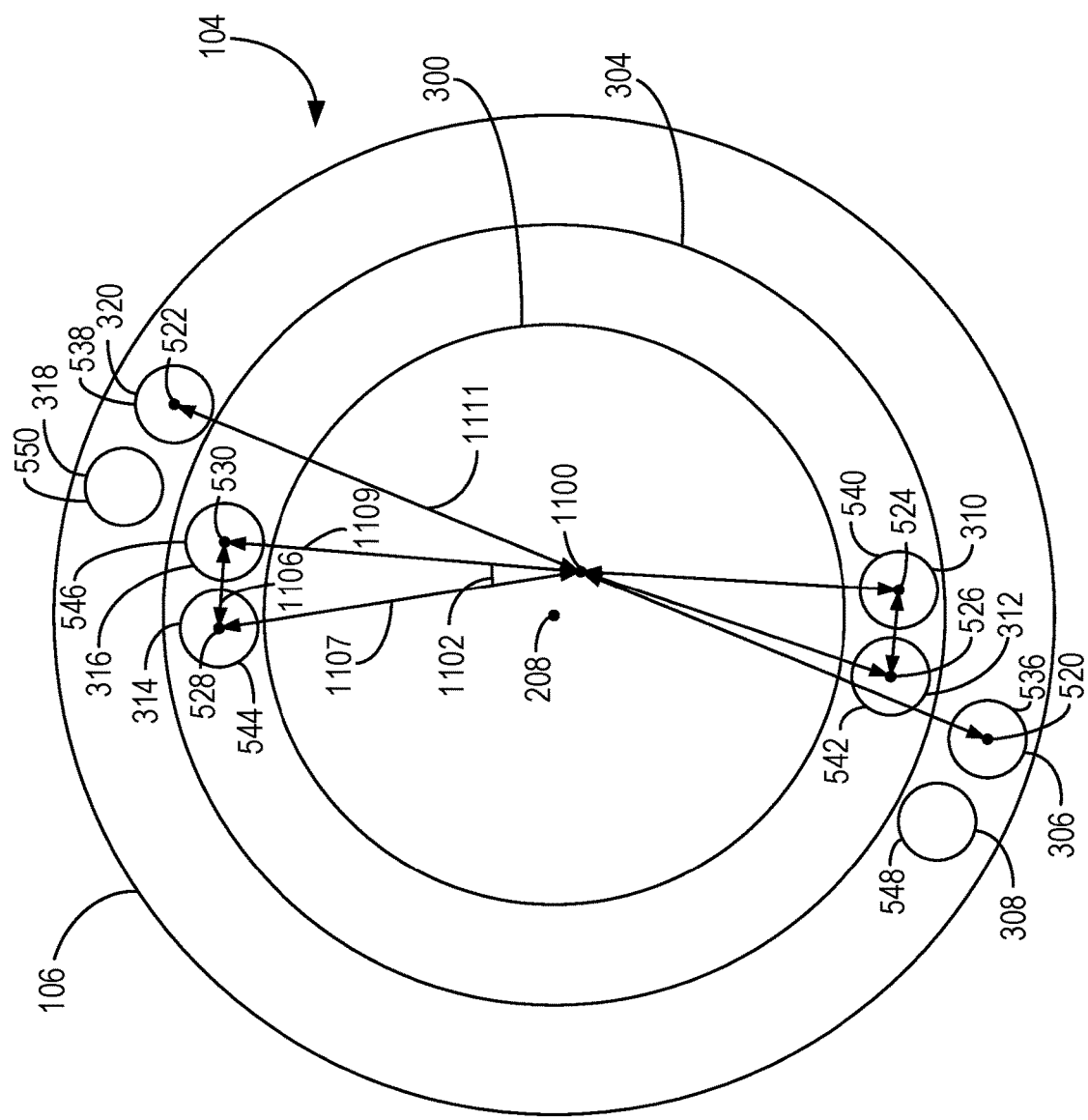
FIG. 11 shows a view of the second end of the rotary user interface of FIGS. 4-10 with illustrated lengths and angles between nibs of the rotary user interface.

FIGS. 10-11 each show a bottom view of the com wheel 104. As shown by FIG. 10, in at least one configuration a diameter 1000 of the rotary knob 106 is larger than a diameter 1002 of the enlarged end section 304 of the support 302. Further, the diameter 1002 of the enlarged end section 304 is larger than a diameter 1004 of the touchscreen mounting element 300.

FIG. 11 illustrates a relative arrangement of the rotary touchscreen nibs, alignment touchscreen nibs, and confirmation touchscreen nibs of the com wheel 104. The rotary touchscreen nibs (e.g., rotary touchscreen nib 536 and rotary touchscreen nib 538) are arranged opposite to each other across a center of the com wheel 104, where the center is indicated by rotation axis 208 (e.g., intersected by rotation axis 208). During conditions in which the operator rotates rotary knob 106 of the com wheel 104, the rotary touchscreen nibs rotate along with the rotary knob as described above. During conditions in which the com wheel 104 is mounted to a touchscreen display (e.g., touchscreen display 102 described above), the rotary touchscreen nibs slide along the surface of the touchscreen display, and the touchscreen display may detect the position (e.g., location) of the rotary touchscreen nibs as the rotary touchscreen nibs slide along the surface of the touchscreen display.

The configuration of the nibs of the com wheel 104 is pre-determined and the relative lengths, angles, etc. between the nibs may be stored in a memory of the controller of the touchscreen display 102 such that the controller may compare lengths and angles between touch inputs applied to the touchscreen display 102 to the pre-determined lengths and angles stored in memory to detect the com wheel 104 and determine that the com wheel 104 is mounted to the touchscreen display 102. For example, the rotary touchscreen nibs and alignment touchscreen nibs of the com wheel 104 may engage in face-sharing contact with the surface of the touchscreen display, and the touchscreen display may transmit signals to the electronic controller indicating the position and relative arrangement of the nibs contacting the touchscreen display based on touch input (e.g., direct surface contact) applied to the touchscreen display by the nibs.

The electronic controller may determine (e.g., calculate) a length between the rotary touchscreen nibs based on touch input to the touchscreen display by the rotary touchscreen nibs. The electronic controller may additionally determine a length between adjacent alignment touchscreen nibs based on touch input applied to the touchscreen display by the adjacent alignment touchscreen nibs. The electronic controller may additionally determine a length between the alignment touchscreen nibs and the center of the com wheel 104. The electronic controller may determine an angle between adjacent alignment touchscreen nibs as measured from the center of the com wheel 104. By determining the parameters as described above, the electronic controller may determine whether the detected contact against the surface of the touchscreen display is a result of the mounting of the com wheel 104 to the touchscreen display. For example, the electronic controller may distinguish between contact against the touchscreen display resulting from a touch of the operator (e.g., contact of the operator's fingers against the touchscreen display) and contact against the touchscreen display resulting from the mounting of the com wheel 104 to the touchscreen display based on the parameters as measured by the electronic controller.

FIG. 11 illustrates some of the parameters the controller may determine based on the touch input applied to the touchscreen display by the com wheel 104. For example, the controller may determine length 1106 between the alignment touchscreen nib 544 including fifth pin support 314 and the alignment touchscreen nib 546 including sixth pin support 316 based on direct contact of said alignment touchscreen nibs with the touch-sensitive surface of the touchscreen display. The controller may compare the length 1106 to a threshold length (e.g., 1 centimeter) in order to determine whether the length 1106 is less than the threshold length. If the length 1106 is determined to be less than the threshold length, the controller may determine that the com wheel 104 is engaged with the touchscreen display, according to the methods described below. The controller may additionally determine length 1107 between the alignment touchscreen nib 544 including fifth pin support 314 and a reference location 1100, as well as a length 1109 between the alignment touchscreen nib 546 including sixth pin support 316 and the reference location 1100. In the example shown, the reference location 1100 is offset from the center of the com wheel 104. However, in some examples, the reference location 1100 may be arranged at the center of the com wheel 104. Length 1107 and length 1109 may be referred to herein as radial lengths. The controller may determine angle 1102 between the touch inputs applied by the alignment touchscreen nibs (e.g., alignment touchscreen nib 544 and alignment touchscreen nib 546) and may compare the angle 1102 to a pre-determined reference angle stored in a memory of the controller for further verification that the touch inputs are a result of engagement of the com wheel 104 with the touchscreen display.

The controller may determine length 1111 between the rotary touchscreen nib 538 including second pin support 320 and the reference location 1100 and may compare the length 1111 to a pre-determined reference length stored in memory of the controller for further verification that the touch inputs are a result of engagement of the com wheel 104 with the touchscreen display. Length 1111 may be referred to herein as a radial length. The length 1107, length 1109, and length 1111 are each measured from the reference location, and in some configurations the reference location is arranged at the center of the com wheel 104 (e.g., at rotation axis 208), as described above.

Although the controller may determine whether the com wheel 104 is engaged with the touchscreen display based on the determined parameters described above, during conditions in which the com wheel 104 is arranged toward an edge of the touchscreen display one or more of the alignment touchscreen nibs (e.g., the alignment touchscreen nib 544 and alignment touchscreen nib 546) and/or one of the rotary touchscreen nibs (e.g., the rotary touchscreen nib 538 including the second pin support 320) may be arranged over (e.g., beyond) the edge of the touchscreen display and may not be in contact with the touch-sensitive surface of the touchscreen display. In the configuration shown, the com wheel 104 includes additional alignment touchscreen nibs (e.g., alignment touchscreen nib 540 and alignment touchscreen nib 542) and an additional rotary touchscreen nib (e.g., rotary touchscreen nib 536) each arranged across the rotation axis 208 relative to the above-described nibs that may engage with the touchscreen display even during conditions in which half of the com wheel 104 is positioned beyond the edge of the touchscreen display.

In particular, the com wheel 104 includes the alignment touchscreen nib 542 including the fourth pin support 312 and the alignment touchscreen nib 540 including the third pin support 310 arranged across the rotation axis 208 relative to the alignment touchscreen nib 544 including the fifth pin support 314 and the alignment touchscreen nib 546 including the sixth pin support 316. The com wheel 104 additionally includes the rotary touchscreen nib 536 including the first pin support 306 arranged across the rotation axis 208 relative to the rotary touchscreen nib 538 including the second pin support 320. The com wheel additionally includes the confirmation touchscreen nib 548 including the seventh pin support 308 arranged across the rotation axis 208 relative to the confirmation touchscreen nib 550 including the eighth pin support 318. By including the alignment touchscreen nibs 540 and 542, the rotary touchscreen nib 536, and the confirmation touchscreen nib 548 across the rotation axis 208 from the alignment touchscreen nibs 544 and 546, the rotary touchscreen nib 538, and the confirmation touchscreen nib 550, a likelihood of detection of the com wheel 104 may be increased during conditions in which the com wheel 104 is positioned proximate to an edge of the touchscreen display. In the configuration shown, the rotary touchscreen nib 536 is offset by the rotary touchscreen nib 538 by 180 degrees around the rotation axis 208. However, in some examples the amount of offset may be different (e.g., greater than 150 degrees around the rotation axis and less than 180 degrees, as one non-limiting example).

In some examples the rotary knob 106 of the com wheel 104 may be removable and interchangeable with a plurality of different rotary knobs having different arrangements of rotary touchscreen nibs and/or confirmation touchscreen nibs. The controller may be configured to recognize the different rotary knobs based on the touch input applied to the touchscreen display by the different nibs of the different rotary knobs while the rotary knobs are coupled to the com wheel. For example, a second rotary knob may include a first rotary touchscreen nib and a second rotary touchscreen nib in a different arrangement relative to the configuration of the rotary touchscreen nib 536 and the rotary touchscreen nib 538 described above. The controller may determine which rotary knob is coupled to the com wheel 104 based on the touch inputs applied to the touchscreen display by the rotary touchscreen nibs and may control the GUI differently based on which rotary knob is coupled to the com wheel 104 (e.g., display a different GUI menu, widget, etc. based on the detected rotary knob).

Figure 12:
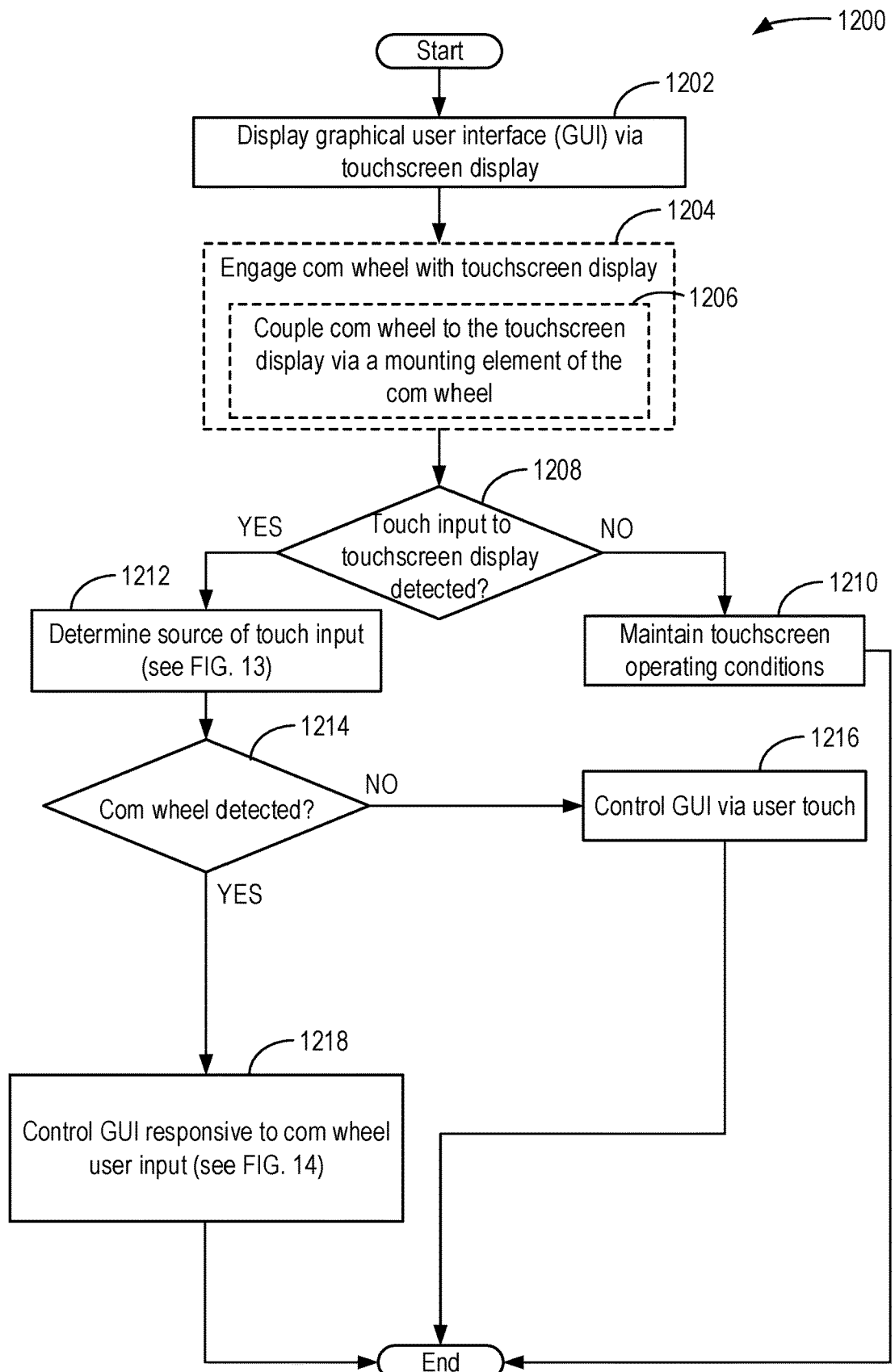
FIG. 12 shows a flowchart illustrating a method for controlling operation of a touchscreen system including a rotary user interface according to an embodiment of the disclosure.

Referring to FIG. 12, a flowchart illustrating a method 1200 for controlling operation of a touchscreen system including a rotary user interface is shown. Instructions for carrying out method 1200 and the rest of the methods included herein may be executed by a controller based on instructions stored on a memory of the controller and in conjunction with signals received from the touchscreen display, such as the touchscreen display described above with reference to FIG. 1.

The method at 1202 includes displaying a graphical user interface (GUI) via the touchscreen display. In some examples, the touchscreen display may be similar to, or the same as, the touchscreen display 102 described above with reference to FIG. 1. The GUI may be a medical graphical user interface, in some examples. As one non-limiting example, the GUI may be configured as an anesthesia and respiratory care management interface including one or more menus, displayed images, patient data, care plans, etc. The GUI may include one or more data fields that may be populated and/or adjusted responsive to user input (e.g., numerical data fields, etc.).

The method continues from 1202 to 1204 where the method may include engaging a com wheel with the touchscreen display. The com wheel may be similar to, or the same as, the com wheel 104 described above with reference to FIGS. 2-11. In some examples, the com wheel may be engaged with the touchscreen display prior to 1204 (e.g., already engaged with the touchscreen display). During conditions in which the com wheel is already engaged with the touchscreen display, the engagement of the com wheel with the touchscreen display may be maintained at 1204.

Engaging the com wheel with the touchscreen display at 1202 may include, at 1204, coupling the com wheel to the touchscreen display via a touchscreen mounting element of the com wheel. The touchscreen mounting element may be similar to, or the same as, the mounting element 300 described above with reference to FIG. 3. As one example, the touchscreen mounting element may be a suction cup, and coupling the com wheel to the touchscreen display may include pressing the com wheel against the touchscreen display to releasably mount the com wheel to the touchscreen display via the suction cup. Releasably mounting the com wheel to the touchscreen display refers to mounting (e.g., securing) the com wheel to the touchscreen display such that the com wheel may be removed from the touchscreen display for repositioning (e.g., remounting), maintenance, replacement, etc. without additional tools or fasteners.

The method continues from 1202 or 1204 to 1208 where the method includes determining whether a touch input to the touchscreen display is detected. Determining whether a touch input to the touchscreen is detected may include sensing whether an active touch input is applied to a touch-sensitive surface of the touchscreen display. The touch-sensitive surface may be similar to, or the same as, the touch-sensitive surface of the touchscreen display 102 described above. For example, the touchscreen display may be a capacitive touchscreen display configured to detect a touch input to the touch-sensitive surface of the touchscreen display via a change in capacitance of the touch-sensitive surface resulting from direct contact of a conductive element (e.g., a conductive nib, a user's finger, etc.) with the touch-sensitive surface. The touchscreen display may sense the touch input and may be configured to determine the location of the touch input along the touch-sensitive surface of the touchscreen display.

If a touch input to the touchscreen display is not detected at 1208, the method continues from 1208 to 1210 where the method includes maintaining touchscreen operating conditions. Maintaining touchscreen operating conditions may include maintaining conditions of the GUI displayed by the touchscreen display (e.g., not adjusting a position of GUI elements such as menus, data fields, etc., not adjusting numerical values within data fields of the GUI, etc.).

However, if a touch input to the touchscreen display is detected at 1208, the method continues from 1208 to 1212 where the method includes determining a source of the touch input. Determining the source of the touch input includes determining whether the touch input is a result of a touch applied by the user (e.g., operator) of the touchscreen display directly to the touch-sensitive surface of the touchscreen display (e.g., by pressing a finger or stylus against the touch-sensitive surface) or whether the touch input is a result of coupling of the com wheel to the touchscreen display. Determining the source of the touch input is described further below with reference to method 1300 illustrated by the flow chart of FIG. 13. Determining the source of the touch input at 1212 includes performing the method 1300 described further below.

The method continues from 1212 to 1214 where the method includes determining whether the com wheel is detected. Determining whether the com wheel is detected includes determining whether the result of determining the source of the touch input at 1212 indicates that the com wheel is coupled (e.g., engaged in direct contact) with the touch-sensitive surface of the touchscreen display. For example, if the controller determines at 1212 that the source of the touch input is the com wheel, the controller determines at 1214 that the com wheel is detected.

If the com wheel is not detected at 1214, the method continues from 1214 to 1216 where the method includes controlling the GUI via user touch. Controlling the GUI via user touch may include controlling the GUI based on finger gestures, stylus gestures, etc. applied to the touch-sensitive surface of the touchscreen display by the user. For example, the controller may be configured to detect various gestures applied by the user to the touchscreen display (e.g., pinching gestures, scrolling gestures, etc.) in order to adjust the GUI based on the touch input applied by the user (e.g., to navigate menus of the GUI, adjust the placement of various panels of the GUI, etc.).

The controller is configured to distinguish the touch input applied directly by the user to the touch-sensitive surface of the touchscreen display (e.g., via finger or stylus) from touch input applied to the touch-sensitive surface of the touchscreen display by the com wheel, as described below. In particular, the controller is configured to compare the touch inputs applied to the touchscreen display to parameters of the com wheel to determine whether the com wheel is coupled to the touchscreen display. In the absence of a determination that the com wheel is coupled to the touchscreen display, the controller may be configured to identify the finger or stylus of the user as the source of touch inputs applied to the touchscreen display and controls the GUI displayed by the touchscreen display according to the gestures applied by the user. For example, the user may perform a pinching gesture against the touch-sensitive surface to command the controller to increase or decrease a scaling of the GUI (e.g., zoom the GUI in or out), the user may perform a sweeping gesture against the touch-sensitive surface to command the controller to scroll (e.g., pan) the GUI, etc.

If the com wheel is detected at 1214, the method continues from 1214 to 1218 where the method includes controlling the GUI responsive to com wheel user input. Controlling the GUI responsive to com wheel user input is described below with reference to method 1400 illustrated by the flowchart of FIG. 14. Controlling the GUI responsive to com wheel user input includes performing the method 1400 described further below. Controlling the GUI responsive to com wheel user input may include increasing or decreasing parameters displayed by the GUI responsive to rotation of the com wheel, and/or entering (e.g., confirming) commands to the GUI responsive to pressing the com wheel against the touchscreen display.

Figure 13:
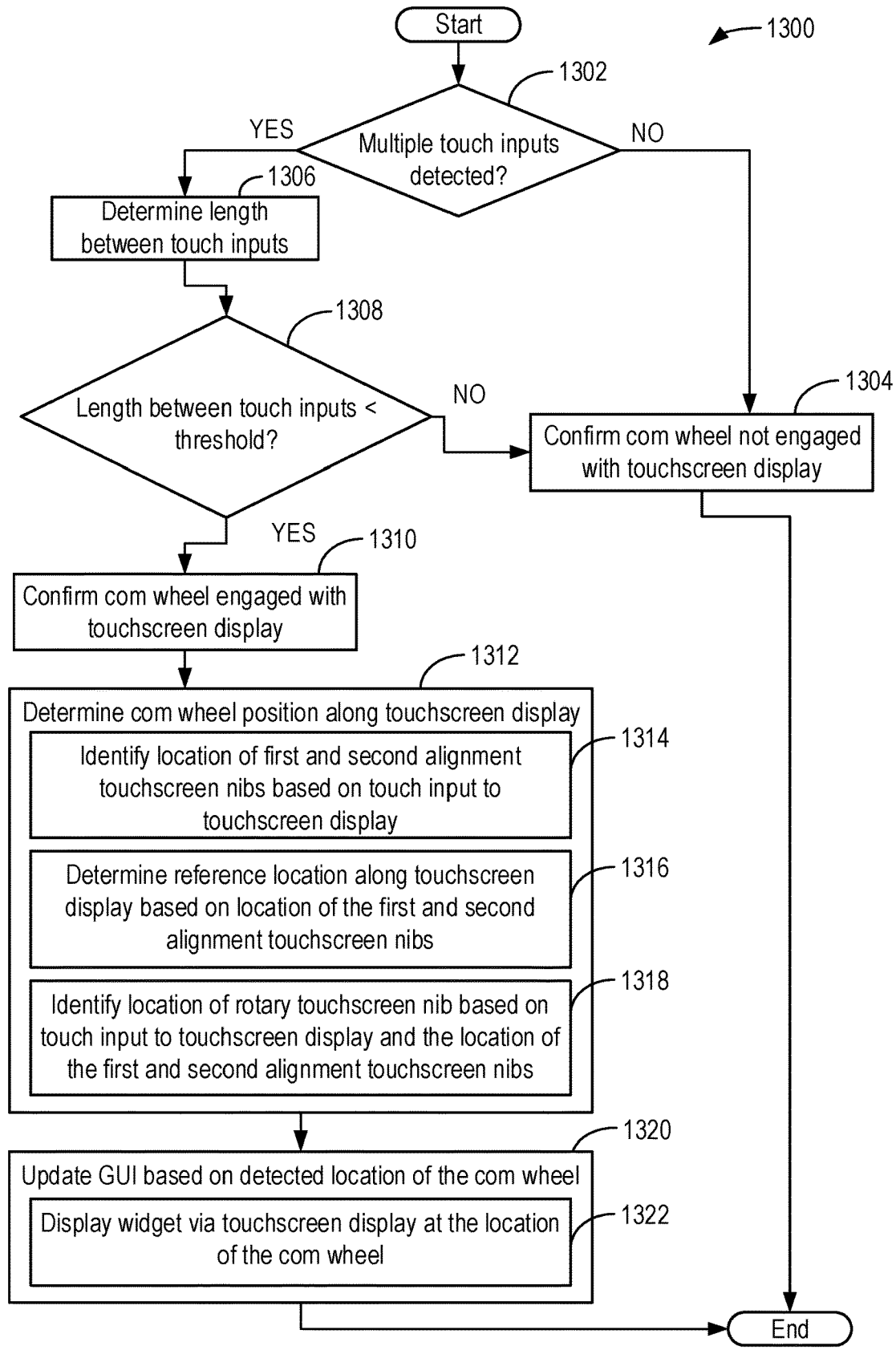
FIG. 13 shows a flowchart illustrating a method for determining engagement of a rotary user interface with a touchscreen display.

Referring to FIG. 13, a flowchart illustrating a method 1300 for determining engagement of a com wheel with a touchscreen display is shown. The method 1300 may be included by method 1200 (e.g., performed at 1212 of method 1200, as described above). Components such as the touchscreen display, com wheel, etc. described with reference to method 1300 may be the same as the respective similarly named components described above with reference to method 1200 illustrated by the flowchart of FIG. 12.

The method at 1302 includes determining whether multiple touch inputs are detected. Determining whether multiple touch inputs are detected includes sensing (e.g., measuring) touch inputs applied simultaneously (e.g., concurrently) to a touchscreen display. As one example, the touchscreen display may be the same as the touchscreen display described above with reference to method 1200 illustrated by the flowchart of FIG. 12. Determining whether multiple touch inputs are detected may include determining a location of each touch input along the touchscreen display and comparing the locations to each other, where the controller may consider touch inputs at different locations as different touch inputs. For example, the controller may determine a first touch input is applied at a first location along the touchscreen display, and a second touch input is concurrently applied at a different, second location along the touchscreen display. Based on the different locations of the touch inputs the controller may determine that multiple touch inputs are detected. However, if the controller determines that a first touch input is applied at a first location and no other touch inputs are concurrently applied to the touchscreen display, the controller determines that multiple touch inputs are not detected.

If multiple touch inputs are not detected at 1302, the method continues from 1302 to 1304 where the method includes confirming that the com wheel is not engaged with the touchscreen display. The com wheel is configured such that during conditions in which the com wheel is coupled to the touchscreen display, the com wheel applies multiple touch inputs to the touchscreen display via nibs of the com wheel. As a result of determining that multiple touch inputs are not detected at 1302, the controller confirms (e.g., determines) that the com wheel is not engaged with the touchscreen display at 1304.

However, if multiple touch inputs are detected at 1302, the method continues from 1302 to 1306 where the method includes determining a length between the touch inputs. Determining the length between the touch inputs may include determining the length between each pair of touch inputs applied to the touchscreen display. For example, at 1302 the controller may determine that three concurrent touch inputs to the touchscreen display are detected. The controller determines the location of each touch input (e.g., by detecting a change in the capacitance of the touchscreen display at the location of each of the touch inputs) and may calculate a length (e.g., distance) between the location of the first touch input and the location of the second input, a length between the location of the first touch input and the location of the third touch input, and a length between the location of the second touch input and the location of the third touch input. In some embodiments, the controller may calculate angles between the location of the first touch input, the location of the second touch input, and the location of the third touch input.

The method continues from 1306 to 1308 where the method includes determining whether the length between the touch inputs is less than a threshold length. The threshold length may be a pre-determined length stored in a memory of the controller. In some examples, the threshold length may be 1 centimeter or less. The threshold length may be sufficiently small such that the user of the touchscreen system (e.g., the operator, such as a technician) would be unable to apply touch inputs to the touchscreen display spaced apart by a length (e.g., distance) smaller than the threshold length using their fingers. For example, the user may apply two touch inputs to the touchscreen display by pressing their index finger and adjacent finger to the touchscreen display, but the length between the touch input applied by the index finger and the touch input applied by the adjacent finger is larger than 1 centimeter. During such conditions, the controller determines that the length between the touch inputs is not less than the threshold length. In some embodiments, the controller may determine whether the length between the touch inputs is within a threshold tolerance or threshold range. For example, the threshold range may be between 0.1 centimeters and 1.5 centimeters. If the length between the touch inputs is greater than 1.5 centimeters, the controller determines that the length is not within the threshold range, and if the length is less than or equal to 1.5 centimeters and greater than or equal to 0.1 centimeters, the controller determines that the length is within the threshold range. The threshold range described above is one non-limiting example of a threshold range, and other examples may be possible.

If the length between the touch inputs is not less than the threshold length at 1308, the method continues from 1308 to 1304 where the method includes confirming that the com wheel is not engaged with the touchscreen display as described above. Because the length between the touch inputs is equal to or greater than the threshold length, the controller may determine that the touch inputs are a result of contact of the fingers of the user or other implements (e.g., a stylus) and that the touch inputs do not result from engagement of the com wheel with the touchscreen display.

However, if the length between the touch inputs is less than the threshold length at 1308, the method continues from 1308 to 1310 where the method includes confirming that the com wheel is engaged with the touchscreen display. The com wheel is configured such that during conditions in which the com wheel is coupled to the touchscreen display, the com wheel applies multiple touch inputs to the touchscreen display via nibs of the com wheel, where the length between at least two of the touch inputs is less than the threshold length. As a result of determining that the length between the touch inputs is less than the threshold length at 1308, the controller confirms (e.g., determines) that the com wheel is engaged with the touchscreen display at 1310.

The method continues from 1310 to 1312 where the method includes determining com wheel position along the touchscreen display. Determining the com wheel position may include determining a location of a center of the com wheel relative to the touchscreen display, as described below. Determining the com wheel position includes determining (e.g., measuring) a location of touchscreen nibs of the com wheel in direct contact with the touch-sensitive surface of the touchscreen display.

Determining the com wheel position along the touchscreen display at 1312 includes, at 1314, identifying a location of first and second alignment touchscreen nibs based on touch input to the touchscreen display. The first alignment touchscreen nib and the second alignment touchscreen nib may be similar to, or the same as, the alignment touchscreen nib including fifth pin support 314 and the alignment touchscreen nib including sixth pin support 316, respectively, described above with reference to FIG. 11.

Determining the com wheel position along the touchscreen display at 1312 includes, at 1316, determining a reference location along the touchscreen display based on the location of the first and second alignment touchscreen nibs. The reference location may be similar to, or the same as, the reference location 1100 described above with reference to FIG. 11. In some examples, the reference location may be the center of the com wheel (e.g., the center of the rotary interface wheel of the com wheel).

Determining the com wheel position along the touchscreen display at 1312 includes, at 1318, identifying a location of a rotary touchscreen nib based on the touch input to the touchscreen display and the location of the first and second alignment touchscreen nibs. The rotary touchscreen nib may be similar to, or the same as, the rotary touchscreen nib including the second pin support 320 as described above with reference to FIG. 11.

In some embodiments, the location of the com wheel along the touchscreen display may be determined based on the location of the touch input applied by the first and second alignment nibs, based on the location of the touch input applied by the rotary touchscreen nib, and/or based on a combination of the location of the touch input applied by the first and second alignment nibs and the location of the touch input applied by the rotary touchscreen nib.

The method continues from 1312 to 1320 where the method includes updating the GUI based on the detected location of the com wheel. Updating the GUI may include displaying one or more menus, parameters, etc. that are not displayed during conditions in which the com wheel is not coupled to the touchscreen display, as described below.

Updating the GUI based on the detected location of the com wheel at 1320 includes, at 1322, displaying a widget via the touchscreen display at the location of the com wheel. Displaying the widget may include displaying an annular menu at the location of the com wheel, where a diameter of the annular menu may be larger than an outer diameter of the com wheel. In this configuration, the annular menu may be centered at the com wheel such that the annular menu extends around a perimeter of the com wheel as viewed by the user of the touchscreen system. In some examples the widget may include various menu segments that may be selected by the user via rotation of the com wheel, as described below.

Figure 14:
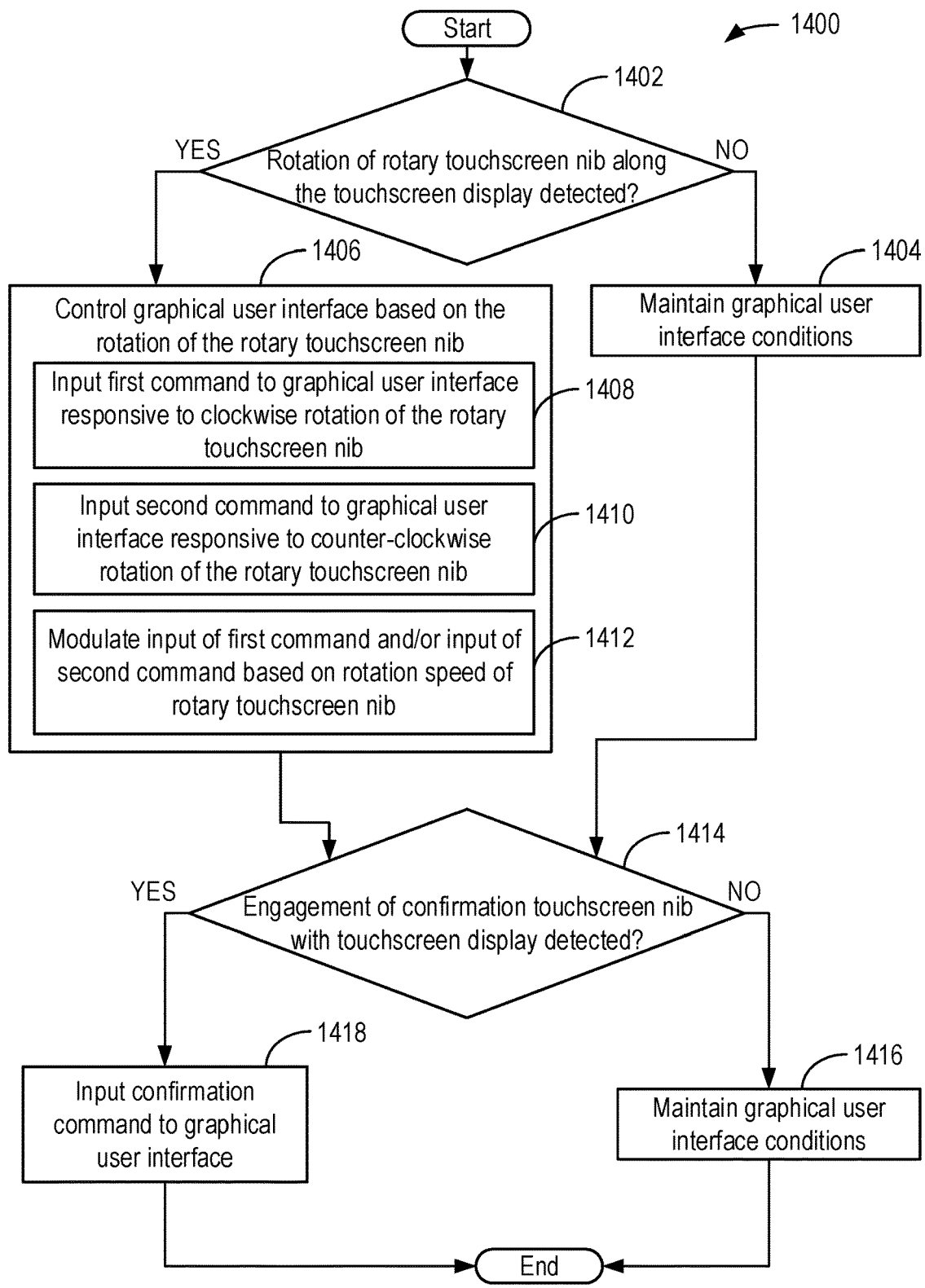
FIG. 14 shows a flowchart illustrating a method for controlling a touchscreen display responsive to rotary user interface input.

Referring to FIG. 14, a flowchart illustrating a method 1400 for controlling a GUI responsive to com wheel user input is shown. The method 1400 may be included by method 1200 (e.g., performed at 1218 of method 1200, as described above). Components such as the touchscreen display, com wheel, etc. described with reference to method 1400 may be the same as the respective similarly named components described above with reference to method 1200 illustrated by the flowchart of FIG. 12 and method 1300 illustrated by the flowchart of FIG. 13.

At 1402, the method includes determining whether rotation of the rotary touchscreen nib along the touchscreen display is detected. The rotary touchscreen nib may be similar to, or the same as, the rotary touchscreen nib described above with reference to the method 1300 illustrated by the flowchart of FIG. 13. Determining whether rotation of the rotary touchscreen nib along the touchscreen display is detected may include tracking a position of the rotary touchscreen nib along the touchscreen display via the touch input applied to the touchscreen display by the rotary touchscreen nib.

For example, while the com wheel is coupled to the touchscreen display, the rotary touchscreen nib is arranged in direct face-sharing contact with the touch-sensitive surface of the touchscreen display. The controller may determine the location of the rotary touchscreen nib along the touchscreen display based on the touch input applied to the touchscreen display by the rotary touchscreen nib. Further, the controller may continuously track (e.g., monitor) the location of the rotary touchscreen nib in order to determine whether the rotary touchscreen nib is moved along the touchscreen display. During conditions in which a rotary knob of the com wheel is rotated relative to the touchscreen display, the rotary touchscreen nib rotates with the rotary knob along the touchscreen display. The controller may detect the movement of the rotary touchscreen nib around the rotational axis of the rotary knob, and responsive to the rotational movement of the rotary touchscreen nib, the controller determines that rotation of the rotary touchscreen nib is detected. However, during conditions in which the rotary knob is not rotated, the rotary touchscreen nib may not rotate around the rotational axis of the rotary knob and the controller may determine that rotation of the rotary touchscreen nib is not detected.

If rotation of the rotary touchscreen nib along the touchscreen display is not detected at 1402, the method continues from 1402 to 1404 where the method includes maintaining graphical user interface (GUI) conditions. Maintaining GUI conditions may include not displaying additional menus and/or parameters, not adjusting data displayed by the GUI, etc.

However, if rotation of the rotary touchscreen nib along the touchscreen display is detected at 1402, the method continues from 1402 to 1406 where the method includes controlling the GUI based on the rotation of the rotary touchscreen nib. For example, the user (e.g., operator) of the touchscreen system may adjust data and/or other parameters, navigate menus, etc. by rotating the rotary knob of the com wheel to rotate the rotary touchscreen nib along the touchscreen display. The controller may detect the rotation of the rotary touchscreen nib around the rotational axis of the rotary knob and along the touchscreen display and may control the GUI accordingly, as described below.

Controlling the GUI based on the rotation of the rotary touchscreen nib at 1406 includes, at 1408, inputting a first command to the GUI responsive to a clockwise rotation of the rotary touchscreen nib. In some examples, the first command may be a command provided by the controller to the touchscreen display to initiate scrolling through menus of the GUI in a first direction, increase a parameter displayed by the GUI (e.g., increase a value of numerical data displayed by the GUI), etc.

Controlling the GUI based on the rotation of the rotary touchscreen nib at 1406 includes, at 1410, inputting a second command to the GUI responsive to a counter-clockwise rotation of the rotary touchscreen nib. In some examples, the second command may be a command provided by the controller to the touchscreen display to initiate scrolling through menus of the GUI in a second direction opposite to the first direction, decrease a parameter displayed by the GUI (e.g., decrease a value of numerical data displayed by the GUI), etc.

Controlling the GUI based on the rotation of the rotary touchscreen nib at 1406 includes, at 1412, modulating the input of the first command and/or the input of the second command based on a rotation speed of the rotary touchscreen nib. Modulating the input of the first command may include adjusting a rate at which the first command is input. For example, during conditions in which the rotary knob is rotated at a first speed in the clockwise direction to rotate the rotary touchscreen nib in the clockwise direction at the first speed along the touchscreen display, the controller may command the touchscreen display to scroll through menus of the GUI in the first direction at the first speed, increase a parameter displayed by the GUI at the first speed, etc. However, during conditions in which the rotary knob is rotated at a second speed in the clockwise direction to rotate the rotary touchscreen nib in the clockwise direction at the second speed along the touchscreen display, the controller may command the touchscreen display to scroll through menus of the GUI in the first direction at the second speed, increase the parameter displayed by the GUI at the second speed, etc. By modulating the input of the first command based on the rotation speed of the rotary touchscreen nib, the user may control the speed of navigation through menus of the GUI and/or control the speed of adjustment of numerical data displayed by the GUI by increasing or decreasing the speed of rotation of the rotary knob. During conditions in which the rotary knob is not rotated, the controller may command the touchscreen display to not scroll through menus of the GUI, not adjust numerical data displayed by the GUI, etc.

In some embodiments, controlling the GUI based on the rotation of the rotary touchscreen nib includes modulating the input of the first command and/or the input of the second command based on a traversed angle of the rotary touchscreen nib (e.g., an amount of distance traversed by the rotary touchscreen nib during the rotation of the rotary touchscreen nib). For example, during conditions in which the rotary touchscreen nib is rotated by a larger, first amount, the controller may command the touchscreen display to scroll through menus of the GUI at a higher, first speed, and during conditions in which the rotary touchscreen nib is rotated by a smaller, second amount, the controller may command the touchscreen display to scroll through menus of the GUI at a lower, second speed.

The method continues from 1406 to 1414 where the method includes determining whether engagement of a confirmation touchscreen nib with the touchscreen display is detected. The confirmation touchscreen nib may be similar to, or the same as, the confirmation touchscreen nib including the eighth pin support 318 as described above with reference to FIG. 11. Determining whether engagement of the confirmation touchscreen nib with the touchscreen display is detected includes determining whether a touch input is applied to the touchscreen display at the location of the confirmation touchscreen nib. For example, the position of the confirmation touchscreen nib relative to the other nibs of the com wheel may be known to the controller (e.g., stored in a memory of the controller). In particular, the com wheel is configured with various nibs in a pre-determined relative arrangement to each other, and the controller may include the lengths between the nibs, the angles between the nibs, etc. stored in the memory of the controller. By determining the location of the com wheel along the touchscreen display (e.g., as described above with reference to method 1300 illustrated by the flowchart of FIG. 13), the controller may determine (e.g., estimate) the position of the confirmation touchscreen nib relative to other nibs of the com wheel (e.g., relative to the rotary touchscreen nib, the alignment touchscreen nibs, etc.).

During conditions in which a touch input is applied to the touchscreen display at the location of the confirmation touchscreen nib, the controller may determine that the touch input is a result of direct contact of the confirmation touchscreen nib with the touch-sensitive surface of the touchscreen display. For example, as described above, the user may press the com wheel toward the touchscreen display in order to compress biasing elements of the com wheel and to press the confirmation touchscreen nib against the touchscreen display. While the confirmation touchscreen nib is pressed against the touchscreen display, the confirmation touchscreen nib applies a touch input to the touchscreen display. During conditions in which the com wheel is not pressed toward the touchscreen display by the user, the biasing elements may bias the com wheel away from the touchscreen display such that the confirmation touchscreen nib does not come into direct contact with the touch-sensitive surface of the touchscreen display.

If engagement of the confirmation touchscreen nib with the touchscreen display is not detected at 1414, the method continues from 1414 to 1416 where the method includes maintaining GUI conditions. Maintaining GUI conditions may include not inputting a confirmation command to the GUI (e.g., not adjusting parameters displayed by the GUI).

However, if engagement of the confirmation touchscreen nib with the touchscreen display is detected at 1414, the method continues from 1414 to 1418 where the method includes inputting a confirmation command to the GUI. The confirmation command may be similar to, or the same as, an "enter" command provided by pressing an "enter" key of a user interface device such as a keyboard. For example, as a result of inputting the confirmation command, the controller may accept (e.g., finalize) adjustments made to parameters displayed by the touchscreen display by the user via rotation of the rotary knob of the com wheel (e.g., store the adjusted parameters to memory). As another example, as a result of inputting the confirmation command, the controller may adjust menus displayed by the GUI (e.g., enlarge a menu selected by the user via rotation of the rotary knob of the com wheel). Other examples are possible.

In some examples, the rotary user interface may be used with a variety of different touchscreen displays. For example, touchscreen displays having different dimensions, sensors for detecting touch inputs, etc. may be configured to detect the engagement of the rotary user interface and may be configured with a GUI that may be adjusted responsive to the engagement and operation of the rotary user interface.

The disclosure also provides support for a rotary user interface for a touchscreen display, comprising: an alignment touchscreen nib, a rotary interface wheel, and a rotary touchscreen nib coupled to the rotary interface wheel and rotatable relative to the alignment touchscreen nib via the rotary interface wheel. In a first example of the system, the rotary touchscreen nib is fixed to the rotary interface wheel and rotates around a rotational axis of the rotary interface wheel with the rotary interface wheel. In a second example of the system, optionally including the first example, the rotary touchscreen nib and the alignment touchscreen nib extend parallel to each other and a rotational axis of the rotary interface wheel. In a third example of the system, optionally including one or both of the first and second examples, the alignment touchscreen nib is a first alignment touchscreen nib, and further comprising a second alignment touchscreen nib having a center spaced apart from a center of the first alignment touchscreen nib. In a fourth example of the system, optionally including one or more or each of the first through third examples, a first radial length between a rotational axis of the rotary interface wheel and the first alignment touchscreen nib is equal to a second radial length between the rotational axis and the second alignment touchscreen nib. In a fifth example of the system, optionally including one or more or each of the first through fourth examples, a third radial length between the rotational axis and the rotary touchscreen nib is greater than each of the first radial length and the second radial length. In a sixth example of the system, optionally including one or more or each of the first through fifth examples, the system further comprises: a first biasing element biasing the alignment touchscreen nib away from the rotary interface wheel, a second biasing element biasing the rotary touchscreen nib away from the rotary interface wheel, and a conductive element configured to engage with the touchscreen display to indicate a user input to the rotary user interface, and wherein the rotary interface wheel is a detented rotary interface wheel including a plurality of detents or an undetented rotary interface wheel. In a seventh example of the system, optionally including one or more or each of the first through sixth examples. wherein a length of the rotary touchscreen nib is greater than a length of the alignment touchscreen nib, and a length from the rotary interface wheel to an end of the rotary touchscreen nib is equal to a length from the rotary interface wheel to an end of the alignment touchscreen nib. In a eighth example of the system, optionally including one or more or each of the first through seventh examples, the system further comprises: a confirmation touchscreen nib coupled to the rotary interface wheel, where a length of the confirmation touchscreen nib is less than a length of the rotary touchscreen nib. In a ninth example of the system, optionally including one or more or each of the first through eighth examples, the system further comprises: a touchscreen mounting element arranged opposite to the rotary interface wheel along a rotational axis of the rotary interface wheel.

The disclosure also provides support for a rotary user interface for a touchscreen display, comprising: a rotary interface wheel, a first alignment touchscreen nib and a second alignment touchscreen nib arranged opposite to each other across a rotational axis of the rotary interface wheel, and a first rotary touchscreen nib and a second rotary touchscreen nib fixed to the rotary interface wheel and arranged opposite to each other across the rotational axis. In a first example of the system, a length between the first rotary touchscreen nib and a center of the rotary interface wheel is equal to a length between the second rotary touchscreen nib and the center of rotary interface wheel. In a second example of the system, optionally including the first example, a length between the first alignment touchscreen nib and the center of the rotary interface wheel is equal to a length between the second alignment touchscreen nib and the center of the rotary interface wheel, and wherein the length between the first alignment touchscreen nib and the center of the rotary interface wheel and the length between the second alignment touchscreen nib and the center of the rotary interface wheel are each smaller than the length between the first rotary touchscreen nib and the center of the rotary interface wheel. In a third example of the system, optionally including one or both of the first and second examples, the touchscreen display is configured to detect engagement of the rotary user interface with the touchscreen display and to control a graphical user interface displayed by the touchscreen display based on a position of the rotary user interface along the touchscreen display, and wherein the rotary user interface is detectable by the touchscreen display while up to 50% of the rotary user interface is arranged beyond a bezel or outer edge of the touchscreen display. In a fourth example of the system, optionally including one or more or each of the first through third examples, the system further comprises: a first confirmation touchscreen nib and a second confirmation touchscreen nib arranged opposite to each other across the rotational axis, where a length of the first confirmation touchscreen nib is equal to a length of the second confirmation touchscreen nib. and each of the length of the first confirmation touchscreen nib and the length of the second confirmation touchscreen nib is less than each of a length of the first rotary touchscreen nib and a length of the second rotary touchscreen nib. In a fifth example of the system, optionally including one or more or each of the first through fourth examples, the rotary interface wheel is one of a plurality of interchangeable rotary interface wheels, with each other rotary interface wheel of the plurality of interchangeable rotary interface wheels including a different angle between rotary touchscreen nibs relative to an angle between the first rotary touchscreen nib and the second rotary touchscreen nib.

In a sixth example of the system, optionally including one or more or each of the first through fifth examples, the alignment touchscreen nib is biased away from the rotary interface wheel by a first biasing element and the rotary touchscreen nib is biased away from the rotary interface wheel by a second biasing element.

In a seventh example of the system, optionally including one or more or each of the first through sixth examples, the first rotary touchscreen nib is offset from the second rotary touchscreen nib by at least 150 degrees around the rotational axis of the rotary interface wheel.

The disclosure also provides support for a method, comprising: determining engagement of a rotary user interface with a touchscreen display responsive to touch input applied to the touchscreen display by the rotary user interface, and controlling the touchscreen display via the rotary user interface based on the touch input. In a first example of the method, the method further comprises: displaying a graphical user interface (GUI) via the touchscreen display, and wherein controlling the touchscreen display via the rotary user interface includes updating the GUI responsive to the touch input applied to the touchscreen display by the rotary user interface. In a second example of the method, optionally including the first example, determining engagement of a rotary user interface with a touchscreen display responsive to touch input applied to the touchscreen display by the rotary user interface includes measuring a length between a first location of the touch input and a second location of the touch input and comparing the length to a threshold length. In a third example of the method, optionally including one or both of the first and second examples, the method further comprises: detecting the rotary user interface only when a user touches the rotary user interface via a conductive element sufficiently small to generate a touch event only when the user touches the rotary user interface.

In a fourth example of the method, optionally include one or more or each of the first through third examples, determining engagement of a rotary user interface with a touchscreen display responsive to touch input applied to the touchscreen display by the rotary user interface includes determining a center of a rotary interface wheel of the rotary user interface along the touchscreen display based on a first location of touch input applied to the touchscreen display by a first alignment touchscreen nib of the rotary user interface, a second location of touch input applied to the touchscreen display by a second alignment touchscreen nib of the rotary user interface, and a third location of touch input applied to the touchscreen display by a first rotary touchscreen nib of the rotary user interface.

FIGS. 1-11 are shown to scale, although other relative dimensions may be used, if desired.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A rotary user interface for a touchscreen display, comprising:
   an alignment touchscreen nib, the alignment touchscreen nib being electrically conductive for providing a touch input on a touchscreen;
   a rotary interface wheel;
   a rotary touchscreen nib coupled to the rotary interface wheel and rotatable relative to the alignment touchscreen nib via the rotary interface wheel, the rotary touchscreen nib being electrically conductive for providing a touch input on the touchscreen;

a mounting element arranged opposite the rotary interface wheel, wherein the rotary user interface is repositionable to a plurality of positions along the touchscreen display via the mounting element, and wherein the rotary user interface is releasably mounted to the touchscreen display via the mounting element;

a first biasing element biasing the alignment touchscreen nib away from the rotary interface wheel;

a second biasing element biasing the rotary touchscreen nib away from the rotary interface wheel; and a conductive element configured to engage with the touchscreen display to indicate a user input to the rotary user interface;

wherein the rotary interface wheel is a detented rotary interface wheel including a plurality of detents or an undetented rotary interface wheel.

2. The rotary user interface of claim 1, wherein the rotary touchscreen nib is fixed to the rotary interface wheel and rotates around a rotational axis of the rotary interface wheel with the rotary interface wheel.

3. The rotary user interface of claim 1, wherein the rotary touchscreen nib and the alignment touchscreen nib extend parallel to each other and a rotational axis of the rotary interface wheel.

4. The rotary user interface of claim 1, wherein the alignment touchscreen nib is a first alignment touchscreen nib, and further comprising a second alignment touchscreen nib having a center spaced apart from a center of the first alignment touchscreen nib.

5. The rotary user interface of claim 4, wherein a first radial length between a rotational axis of the rotary interface wheel and the first alignment touchscreen nib is equal to a second radial length between the rotational axis and the second alignment touchscreen nib.

6. The rotary user interface of claim 5, wherein a third radial length between the rotational axis and the rotary touchscreen nib is greater than each of the first radial length and the second radial length.

7. The rotary user interface of claim 1, wherein a length of the rotary touchscreen nib is greater than a length of the alignment touchscreen nib, and a length from the rotary interface wheel to an end of the rotary touchscreen nib is equal to a length from the rotary interface wheel to an end of the alignment touchscreen nib.

8. The rotary user interface of claim 1, further comprising a confirmation touchscreen nib coupled to the rotary interface wheel, wherein a length of the confirmation touchscreen nib is less than a length of the rotary touchscreen nib.

9. The rotary user interface of claim 1, further comprising a touchscreen mounting element arranged opposite to the rotary interface wheel along a rotational axis of the rotary interface wheel.

10. The rotary user interface of claim 1, wherein the mounting element is a suction cup.

11. A rotary user interface for a touchscreen display, comprising:

a rotary interface wheel;

a first alignment touchscreen nib and a second alignment touchscreen nib arranged opposite to each other across a rotational axis of the rotary interface wheel, the first alignment touchscreen nib and the second alignment touchscreen nib being electrically conductive for providing a touch input on a touchscreen;

a first rotary touchscreen nib and a second rotary touchscreen nib fixed to the rotary interface wheel and arranged opposite to each other across the rotational axis, the first rotary touchscreen nib and the second rotary touchscreen nib being electrically conductive for providing a touch input on the touchscreen; and a mounting element arranged opposite the rotary interface wheel, wherein the rotary user interface is repositionable to a plurality of positions along the touchscreen display via the mounting element, and wherein the rotary user interface is releasably mounted to the touchscreen display via the mounting element;

wherein the rotary interface wheel is one of a plurality of interchangeable rotary interface wheels, with each other rotary interface wheel of the plurality of interchangeable rotary interface wheels including a different angle between rotary touchscreen nibs relative to an angle between the first rotary touchscreen nib and the second rotary touchscreen nib.

12. The rotary user interface of claim 11, wherein a length between the first rotary touchscreen nib and a center of the rotary interface wheel is equal to a length between the second rotary touchscreen nib and the center of rotary interface wheel.

13. The rotary user interface of claim 12, wherein a length between the first alignment touchscreen nib and the center of the rotary interface wheel is equal to a length between the second alignment touchscreen nib and the center of the rotary interface wheel, and wherein the length between the first alignment touchscreen nib and the center of the rotary interface wheel and the length between the second alignment touchscreen nib and the center of the rotary interface wheel are each smaller than the length between the first rotary touchscreen nib and the center of the rotary interface wheel.

14. The rotary user interface of claim 11, wherein the touchscreen display is configured to detect engagement of the rotary user interface with the touchscreen display and to control a graphical user interface displayed by the touchscreen display based on a position of the rotary user interface along the touchscreen display, and wherein the rotary user interface is detectable by the touchscreen display while up to 50% of the rotary user interface is arranged beyond a bezel or outer edge of the touchscreen display.

15. The rotary user interface of claim 11, further comprising a first confirmation touchscreen nib and a second confirmation touchscreen nib arranged opposite to each other across the rotational axis, wherein a length of the first confirmation touchscreen nib is equal to a length of the second confirmation touchscreen nib, and wherein each of the length of the first confirmation touchscreen nib and the length of the second confirmation touchscreen nib is less than each of a length of the first rotary touchscreen nib and a length of the second rotary touchscreen nib.

16. A method, comprising:

determining engagement of a rotary user interface with a touchscreen display responsive to touch input applied to the touchscreen display by the rotary user interface, the rotary user interface repositionable to a plurality of positions along the touchscreen display via a mounting element, wherein the rotary user interface is releasably mounted to the touchscreen display via the mounting element; and controlling the touchscreen display via the rotary user interface based on the touch input, wherein determining engagement of a rotary user interface with a touchscreen display responsive to touch input applied to the touchscreen display by the rotary user interface includes measuring a length between a first location of the touch input and a second location of the touch input and comparing the length to a threshold length.

17. The method of claim 16, further comprising:
- displaying a graphical user interface (GUI) via the touchscreen display; and
- wherein controlling the touchscreen display via the rotary user interface includes updating the GUI responsive to the touch input applied to the touchscreen display by the rotary user interface.

18. The method of claim 16, wherein determining engagement of a rotary user interface with a touchscreen display responsive to touch input applied to the touchscreen display by the rotary user interface includes determining a center of a rotary interface wheel of the rotary user interface along the touchscreen display based on a first location of touch input applied to the touchscreen display by a first alignment touchscreen nib of the rotary user interface, a second location of touch input applied to the touchscreen display by a second alignment touchscreen nib of the rotary user interface, and a third location of touch input applied to the touchscreen display by a first rotary touchscreen nib of the rotary user interface.

* * * * *